(12) United States Patent
Arffman et al.

(10) Patent No.: US 12,146,809 B2
(45) Date of Patent: Nov. 19, 2024

(54) METHOD AND APPARATUS FOR MONITORING NUMBER DENSITY OF AEROSOL PARTICLES

(71) Applicant: Dekati Oy, Kangasala (FI)

(72) Inventors: Anssi Arffman, Kangasala (FI); Ari Ukkonen, Kangasala (FI); Markus Nikka, Kangasala (FI); Esa Luntta, Kangasala (FI); Erkki Lamminen, Kangasala (FI)

(73) Assignee: Dekati Oy, Kangasala (FI)

( * ) Notice: Subject to any disclaimer, the term of this patent is extended or adjusted under 35 U.S.C. 154(b) by 322 days.

(21) Appl. No.: 17/793,705

(22) PCT Filed: Feb. 2, 2021

(86) PCT No.: PCT/FI2021/050070
§ 371 (c)(1),
(2) Date: Jul. 19, 2022

(87) PCT Pub. No.: WO2021/156541
PCT Pub. Date: Aug. 12, 2021

(65) Prior Publication Data
US 2023/0060801 A1 Mar. 2, 2023

(30) Foreign Application Priority Data
Feb. 5, 2020 (FI) .................................... 20205122

(51) Int. Cl.
G01M 15/10 (2006.01)
G01N 1/22 (2006.01)
G01N 15/06 (2006.01)

(52) U.S. Cl.
CPC ........ *G01M 15/102* (2013.01); *G01N 1/2252* (2013.01); *G01N 15/0656* (2013.01)

(58) Field of Classification Search
CPC . G01M 15/102; G01N 1/2252; G01N 5/0636; G01N 2001/2255
See application file for complete search history.

(56) References Cited

U.S. PATENT DOCUMENTS 8,627,733 B2 1/2014 Marra
9,791,360 B2 * 10/2017 Niemelä ............ G01N 15/0618
(Continued)

FOREIGN PATENT DOCUMENTS

EP 2264429 A1 12/2010
EP 2853882 A1 4/2015
(Continued)

OTHER PUBLICATIONS

International Preliminary Report on Patentability, European Patent Office, Application No. PCT/FI2021/050070, mailed May 18, 2022, 15 pages.

(Continued)

*Primary Examiner* — Justin N Olamit
(74) *Attorney, Agent, or Firm* — Ziegler IP Law Group LLC

(57) ABSTRACT

An apparatus for measuring aerosol particles includes
a charging unit to form charged particles by charging particles of an aerosol sample flow by diffusion charging, and
a collecting unit to provide an electric current by collecting charges from the charged particles by diffusion of the charged particles, the electric current being indicative of number density of aerosol particles of the aerosol sample flow.
The internal pressure of the collecting unit is maintained at a reduced value in order to provide a flat response of the electric current for detecting nanoparticles of different sizes.

11 Claims, 15 Drawing Sheets

(56) References Cited

U.S. PATENT DOCUMENTS

| | | | |
|---|---|---|---|
| 9,791,361 B2 * | 10/2017 | Niemelä | G01M 15/102 |
| 11,187,641 B2 * | 11/2021 | Montajir | G01N 15/065 |
| 11,885,729 B2 * | 1/2024 | Kim | G01N 15/0656 |
| 2010/0001184 A1 | 1/2010 | Chen et al. | |
| 2017/0115197 A1 | 4/2017 | Niemelä et al. | |
| 2018/0238777 A1 | 8/2018 | Janka et al. | |

FOREIGN PATENT DOCUMENTS

| | | |
|---|---|---|
| KR | 20100105661 A | 9/2010 |
| WO | 9731265 A1 | 8/1997 |
| WO | 2019012185 A1 | 1/2019 |

OTHER PUBLICATIONS

International Search Report, European Patent Office, Application No. PCT/FI2021/050070, mailed Apr. 30, 2021, 6 pages.
Written Opinion of the International Searching Authority, European Patent Office, Application No. PCT/FI2021/050070, mailed Apr. 30, 2021, 6 pages.

* cited by examiner

METHOD AND APPARATUS FOR MONITORING NUMBER DENSITY OF AEROSOL PARTICLES

FIELD

Some embodiments relate to measuring aerosol particles.

BACKGROUND

Aerosol emissions from internal combustion engines may be harmful to the environment. Aerosol measurements may be used e.g. for checking whether the mass concentration of aerosol particles in the exhaust gas of an internal combustion engine is lower than a predetermined regulatory limit. The mass concentration of aerosol particles may be measured e.g. by collecting the aerosol particles by a filter, and by weighing the filter in order to determine the total mass of the collected particles. After weighing, an average particle mass concentration may be calculated by dividing the total mass of the collected particles by the total volume of the gas guided through the filter. Collecting a sufficient amount of aerosol particles by the filter may require a relatively long time period, e.g. several hours. Weighing the filter may require manual work, or may require the use of expensive automatic weighing equipment.

The particle deposit collected on the filter may be analyzed e.g. by using microscopy and image analysis. However, it may be difficult or impossible to determine an original number density of the aerosol particles in the exhaust gas by analyzing the collected particle deposit.

The number density of aerosol particles may be measured e.g. by using an aerosol particle counter. The operation of the particle counter is typically based on optical scattering. The aerosol particle counter may illuminate an aerosol sample flow e.g. with a laser beam, and the aerosol particle counter may count light pulses caused by light-scattering aerosol particles. Aerosol particle counters have been used e.g. for verifying quality of air in cleanrooms, or for measuring number density of aerosol particles in urban environments.

SUMMARY

Some versions relate to an apparatus for measuring number density of aerosol particles of an aerosol sample flow. Some versions relate to a method for measuring number density of aerosol particles of an aerosol sample flow. Some versions relate to an apparatus for measuring number density of aerosol particles emitted from an exhaust duct. Some versions relate to a method for determining whether number density of aerosol particles emitted from an exhaust duct is smaller than a predetermined limit value or not.

The exhaust duct may be e.g. an exhaust gas duct of an internal combustion engine. The exhaust duct may be e.g. an exhaust gas duct of a vehicle, which comprises an internal combustion engine. The exhaust duct may be e.g. a duct of a power station. The exhaust duct may be e.g. a duct of a factory.

According to an aspect, there is provided an apparatus (500) comprising:
- a charging unit (100) to form charged particles (P1) by charging particles (P0) of an aerosol sample flow (FG1) by diffusion charging,
- a collecting unit (200) to provide an electric current ($I_1(t)$) by collecting charges from the charged particles (P1) by diffusion of the charged particles (P1), the electric current ($I_1(t)$) being indicative of number density ($n_0(t)$) of aerosol particles (P0) of the aerosol sample flow (FG1),
- a pressure reducing unit (PDU1), and
- a suction unit (VAC1), wherein the pressure reducing unit (PDU1) and the suction unit (VAC1) are arranged to keep an internal pressure ($p_2$) of the collecting unit (200) at a selected value ($p_{SET}$).

According to an aspect, there is provided an apparatus (500) comprising:
- a charging unit (100) to form charged particles (P1) by charging particles (P0) of an aerosol sample flow (FG1) by diffusion charging,
- a collecting unit (200) to provide an electric current ($I_1(t)$) by collecting charges from the charged particles (P1) by diffusion of the charged particles (P1), the electric current ($I_1(t)$) being indicative of number density ($n_0(t)$) of aerosol particles (P0) of the aerosol sample flow (FG1),
- a pressure reducing unit (PDU1) to reduce pressure of the aerosol sample flow (FG1), and
- a suction unit (VAC1) to draw the aerosol sample flow (FG1) via the charging unit (100) to the collecting unit (200), wherein a charging efficiency function ($\eta_1(d_p)$) is indicative of an efficiency of the diffusion charging to charge the particles (P1) as a function of particle size ($d_p$),
wherein a collecting efficiency function ($\eta_2(d_p)$) is indicative of an efficiency for collecting the charges by diffusion of the charged particles (P1) as a function of particle size ($d_p$),
wherein the pressure reducing unit (PDU1) and the suction unit (VAC1) are arranged to keep an internal pressure ($p_2$) of the collecting unit (200) at a selected pressure value ($p_{SET}$) such that a negative slope ($\Delta\eta_2/\Delta d_p$) of the collecting efficiency function ($\eta_2(d_p)$) at least partly compensates a positive slope ($\Delta\eta_1/\Delta d_p$) of the charging efficiency function ($\eta_1(d_p)$) at least in the particle size range of 40 nm to 200 nm, the selected pressure value ($p_{SET}$) being smaller than or equal to 80 kPa.

The electric current provided by the apparatus may be indicative of an instantaneous number density of aerosol particles of an input flow. A response of the electric current for detecting particles of different sizes may be tailored by selecting the internal pressure of the collecting unit. The internal pressure of the collecting unit may be maintained at a selected reduced value in order to provide a substantially flat response of the electric current for detecting number density of nanoparticles of different sizes. The apparatus may have substantially flat number count response. The selected value of the internal pressure may be substantially lower than the atmospheric pressure. The internal pressure may be selected to provide a substantially flat response e.g. in the particle size range of 40 nm to 200 nm. For example, a response for detecting particles of 40 nm may be substantially equal to a response for detecting particles of 100 nm, and also a response for detecting particles of 200 nm may be substantially equal to the response for detecting particles of 100 nm.

The apparatus may use a combination of diffusion charging and diffusion collecting to provide a number count response, which may be substantially independent of particle size. The electric current provided by the apparatus may be indicative of the instantaneous number density of aerosol particles of an input flow, for particles which are e.g. in the size range of 40 nm to 200 nm. The apparatus may provide a substantially constant response for measuring number density of particles, which are in the size range of 40 nm to 200 nm. The apparatus may provide a substantially constant response for an aerosol sample which has a broad size distribution and/or which has an unknown size distribution.

The internal pressure of a diffusion collector may have an effect on the efficiency for collecting charge of charged particles by the diffusion collector. The internal pressure of the charging unit may have different effect on the efficiency for charging particles by diffusion charging. An effect of particle size $d_p$ on charging the particles may be described by a charging efficiency function $\eta_1(d_p)$. An effect of particle size $d_p$ on collecting charge of the charged particles may be described by a collecting efficiency function $\eta_2(d_p)$. The charging efficiency function $\Theta_1(d_p)$ may increase with increasing particle size $d_p$ in a first size range, whereas the collecting efficiency function $\eta_2(d_p)$ may decrease in said first size range. The pressure of the aerosol sample flow in the collecting unit may have an effect on the shape of the collecting efficiency function $\eta_2(d_p)$. The pressure of the aerosol sample flow may be kept at a selected reduced value ($p_{SET}$) such that a negative slope of the collecting efficiency $\eta_2(d_p)$ may substantially compensate a positive slope of the charging efficiency $\eta_1(d_p)$, so as to provide a total response, which is substantially independent of the particle size.

The number density may also be called as the number concentration. The apparatus may provide the electric current, which allows continuous monitoring of number density of aerosol particles. The apparatus may be used e.g. for detecting rapid changes of the number density aerosol particles in an exhaust gas. The response time of the monitoring signal may be e.g. shorter than 1 s, or even shorter than 0.1 s. The measured results may be optionally recorded in a memory such that the recorded results are associated with time information. The recorded measured results may be optionally time-stamped.

The apparatus may be used e.g. for checking whether number density of aerosol particles in an exhaust gas of a motor of a vehicle is lower than a predetermined limit. The apparatus may be used e.g. for checking whether number density of aerosol particles in an exhaust gas of a vehicle complies with a regulatory limit value specified in a standard and/or in an official regulation.

The reduced internal pressure of the collecting unit may also reduce or avoid condensation of one or more gaseous substances of the aerosol sample flow. The condensation of the substances could e.g. generate new particles, which could disturb measurement of the number density. The reduced condensation may reduce need for cleaning the internal surfaces of the apparatus and/or may allow a longer operating time period without a need to clean the internal surfaces of the apparatus.

The reduced internal pressure of the apparatus may be provided e.g. by using a critical orifice. Using a constant reduce internal pressure together with the critical orifice may keep the flow rate substantially constant. A number density value may be calculated e.g. simply by multiplying a measured electric current value with a calibration coefficient.

Guiding the aerosol sample flow via a first critical orifice and guiding a dilution gas flow to the sampling line via a second critical orifice may provide a diluted sample aerosol flow at a substantially constant known dilution ratio.

The reduced internal pressure may provide a faster velocity of the aerosol sample flow in the sampling line and in the units of the apparatus. Thus, the reduced internal pressure may also provide a faster response.

In an embodiment, the method may comprise measuring a second auxiliary current signal, which is indicative of charge of aerosol particles which leave the (first) collecting unit. The first detector current may be indicative of number concentration of the particles of the input flow, and the second auxiliary signal may be indicative of surface area concentration of aerosol particles of the input flow. The first signal may be substantially independent of particle size e.g. in the size range of 40 nm to 200 nm, whereas the second signal may depend on the particle size in the size range of 40 nm to 200 nm. The different behavior of the first signal and the second signal may e.g. allow estimating an average particle size from these two signals. The method may comprise determining an average particle size from the first detector current and from the second auxiliary current.

In an embodiment, the second auxiliary current signal may be used for checking reliability of a measured number density and/or for checking whether the measuring apparatus operates properly or not. A constant second auxiliary current signal may be an indication that the measurement result is valid and/or that the measuring apparatus is operating properly, in a situation where the particle size distribution of the input flow is known to remain unchanged. A change of the second auxiliary current signal may be an indication that the measurement is not valid and/or that the measuring apparatus is not operating properly, in a situation where the particle size distribution of the input flow is known to remain unchanged.

BRIEF DESCRIPTION OF THE DRAWINGS

In the following examples, several variations will be described in more detail with reference to the appended drawings, in which.

DETAILED DESCRIPTION

Figure 1A:
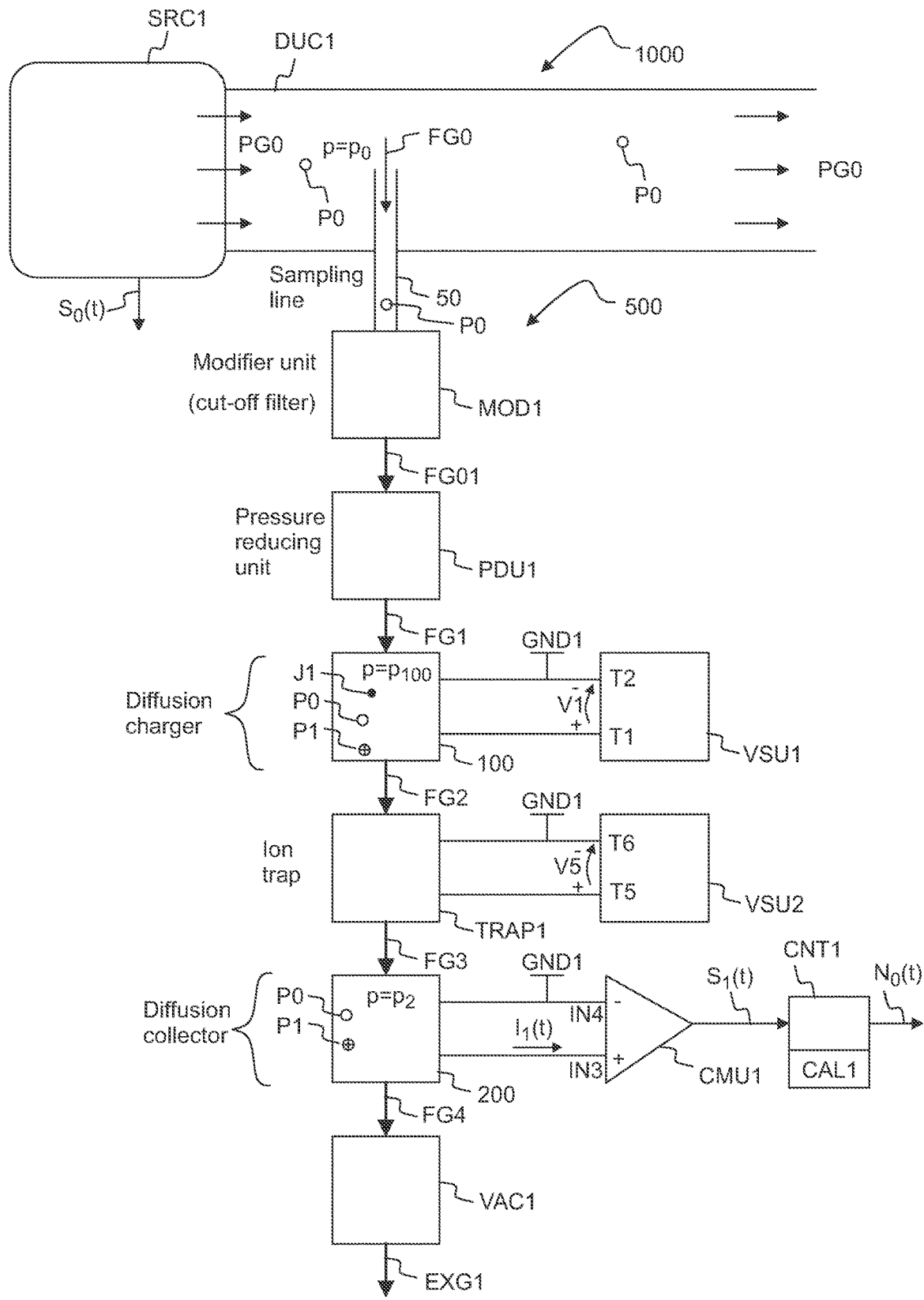
FIG. 1a shows, by way of example, an apparatus for measuring number density of aerosol particles.

Referring to FIG. 1a, a measurement set-up 1000 may comprise an aerosol source SRC1 and the aerosol measuring apparatus 500. The measuring apparatus 500 may be arranged to measure aerosol particles P0 of a primary aerosol PG0. The primary aerosol PG0 may be formed by an aerosol source SRC1. The aerosol source SRC1 may be e.g. an internal combustion engine. The primary aerosol PG0 may be guided or contained in a gas duct DUC1. The apparatus 500 may obtain an aerosol sample flow FG0 from the primary aerosol PG0. The primary aerosol PG0 may carry the aerosol particles P0. The measuring apparatus 500 may continuously monitor the number density of aerosol particles P0 of the primary aerosol PG0.

The measuring apparatus 500 may be arranged to provide an electric current $I_1(t)$ indicative of number density $n_0(t)$ of aerosol particles P0 of a primary aerosol PG0 in an exhaust duct DUC1. The symbol t may denote time.

The measuring apparatus 500 may comprise a pressure reducing unit PDU1, a charging unit 100, a collecting unit 200, and a suction unit VAC1.

The charging unit 100 may receive an aerosol sample flow (FG0, FG1) from an exhaust duct DUC1 e.g. via a sampling line 50. The charging unit 100 may receive an aerosol sample flow (FG1) from the sampling line 50. The aerosol sample flow FG0 may also be called e.g. as an input flow FG0.

Figure 3:
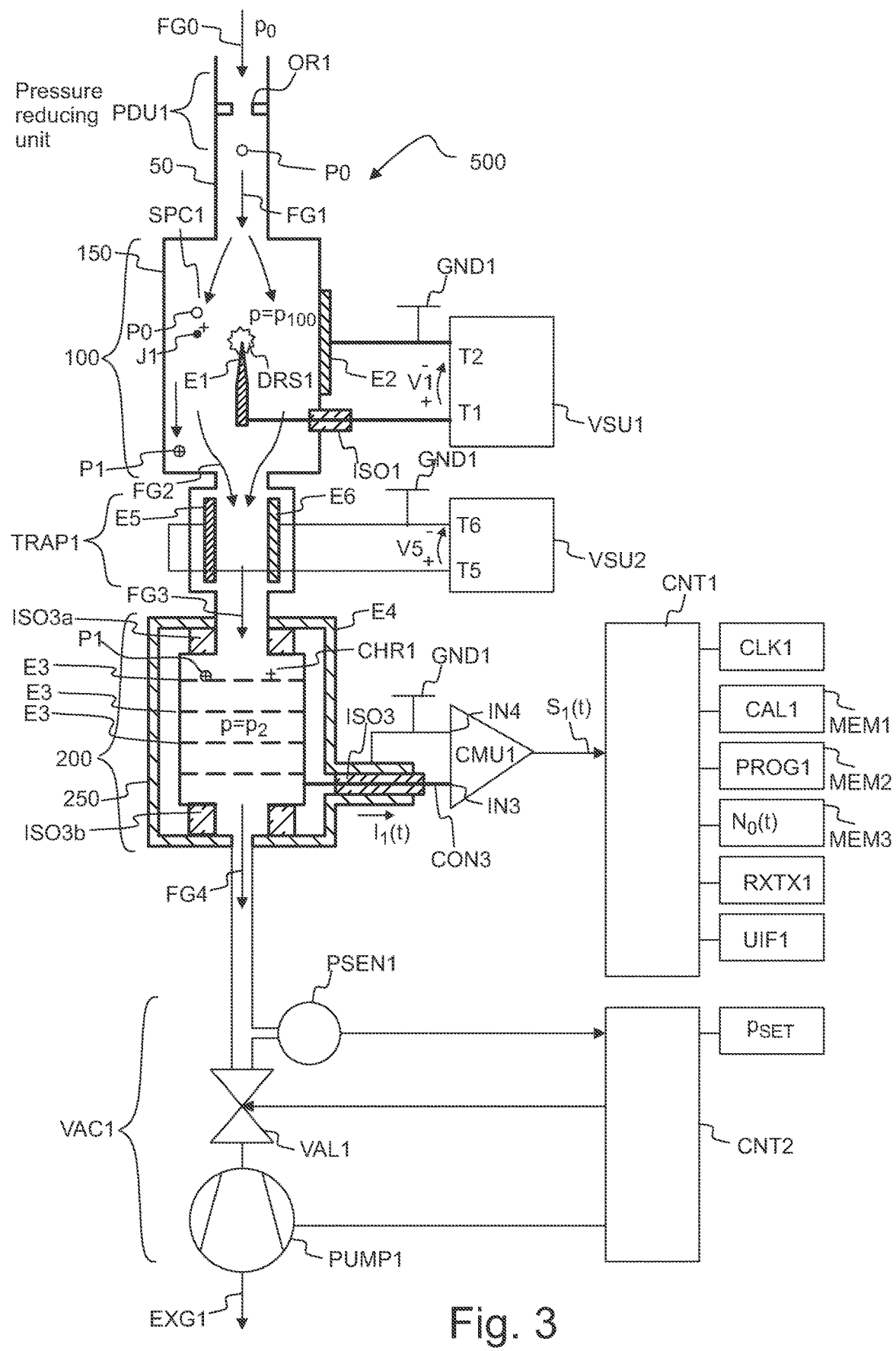
FIG. 3 shows, by way of example, an apparatus for measuring number density of aerosol particles.

The charging unit 100 may comprise an ion source to generate ions J1. The ions J1 may form charged particles P1 by exchanging charge with neutral particles P0. The ion source may be e.g. a corona discharge DSR1 (FIG. 3). The charging unit 100 may comprise a corona electrode E1 to generate the corona discharge DSR1. The charging unit 100 may form charged particles P1 from neutral particles P0 by diffusion charging. The ions may move in the vicinity of the particles by diffusion so that some ions J1 may collide with the particles to transfer charge to the particles. The charging unit 100 may form charged particles P1 from neutral particles P0 by diffusion of the ions J1.

The apparatus 500 may optionally comprise an ion trap TRAP1 to remove ions J1 from the aerosol sample flow (FG2, FG3). The apparatus 500 may be arranged to provide a substantially ion-free aerosol sample flow (FG3), which comprises charged particles P1 formed by diffusion charging.

In an embodiment, the charging unit 100 may comprise one or more regions which may operate as the ion trap TRAP1, wherein the collecting unit 200 may receive an aerosol sample flow (FG2, FG3) directly from the charging unit 100.

The collecting unit 200 may receive an aerosol sample flow (FG3) from the charging unit 100. The collecting unit 200 may comprise one or more collector elements (E3) to collect charge from charged particles (P1). The charged particles (P1) may move by diffusion, wherein some particles (but not all) may contact the collector elements (E3). The collector unit 200 may provide an electric current $I_1(t)$ by collecting charge from the charged particles P1. The electric current $I_1(t)$ may be substantially proportional to a net amount of charge transferred from the charged particles to the collector elements (E3) per unit time. The electric current $I_1(t)$ may be indicative of number density $n_0(t)$ of aerosol particles P0 of the aerosol sample flow FG0 extracted from the exhaust duct DUC1. The electric current $I_1(t)$ may be indicative of number density of aerosol particles in the primary aerosol PG0.

The apparatus 500 may optionally comprise a dilution system for providing a diluted aerosol flow (FG1) from a sample flow FG0 extracted from the primary aerosol PG0. The sample flow may be optionally diluted according to a dilution ratio. The sample flow (FG1, FG2) may be optionally diluted with a dilution ratio. The number density of aerosol particles in the primary aerosol PG0 may be proportional to the number density of aerosol particles carried by the sample flow (FG1, FG2).

The suction unit VAC1 may comprise e.g. an ejector or a pump PUMP1 for causing an aerosol sample flow through the charging unit 100 to the collecting unit 200. The suction unit VAC1 may draw an aerosol sample flow FG1 into the charging unit 100. The suction unit VAC1 may draw an aerosol sample flow (FG2, FG3) from the charging unit 100 to the collecting unit 200. The suction unit VAC1 may cause an aerosol flow from the charging unit 100 to the collecting unit 200 by drawing a flow FG4 from the collecting unit 200. The suction unit VAC1 may also be arranged to keep the internal pressure $p_2$ of the collecting unit 200 substantially equal to a selected pressure value $p_{SET}$. The suction unit VAC1 may operate together with the pressure reducing unit PDU1 to keep the internal pressure $p_2$ of the collecting unit 200 at a predetermined value $p_{SET}$. The pressure value $p_{SET}$ may be substantially smaller than the normal atmospheric pressure (100 kPa). The value $p_{SET}$ may be e.g. smaller than or equal to 80 kPa. The value $p_{SET}$ may be e.g. smaller than or equal to 50 kPa. The value $p_{SET}$ may be e.g. smaller than or equal to 20 kPa.

Figure 8A:
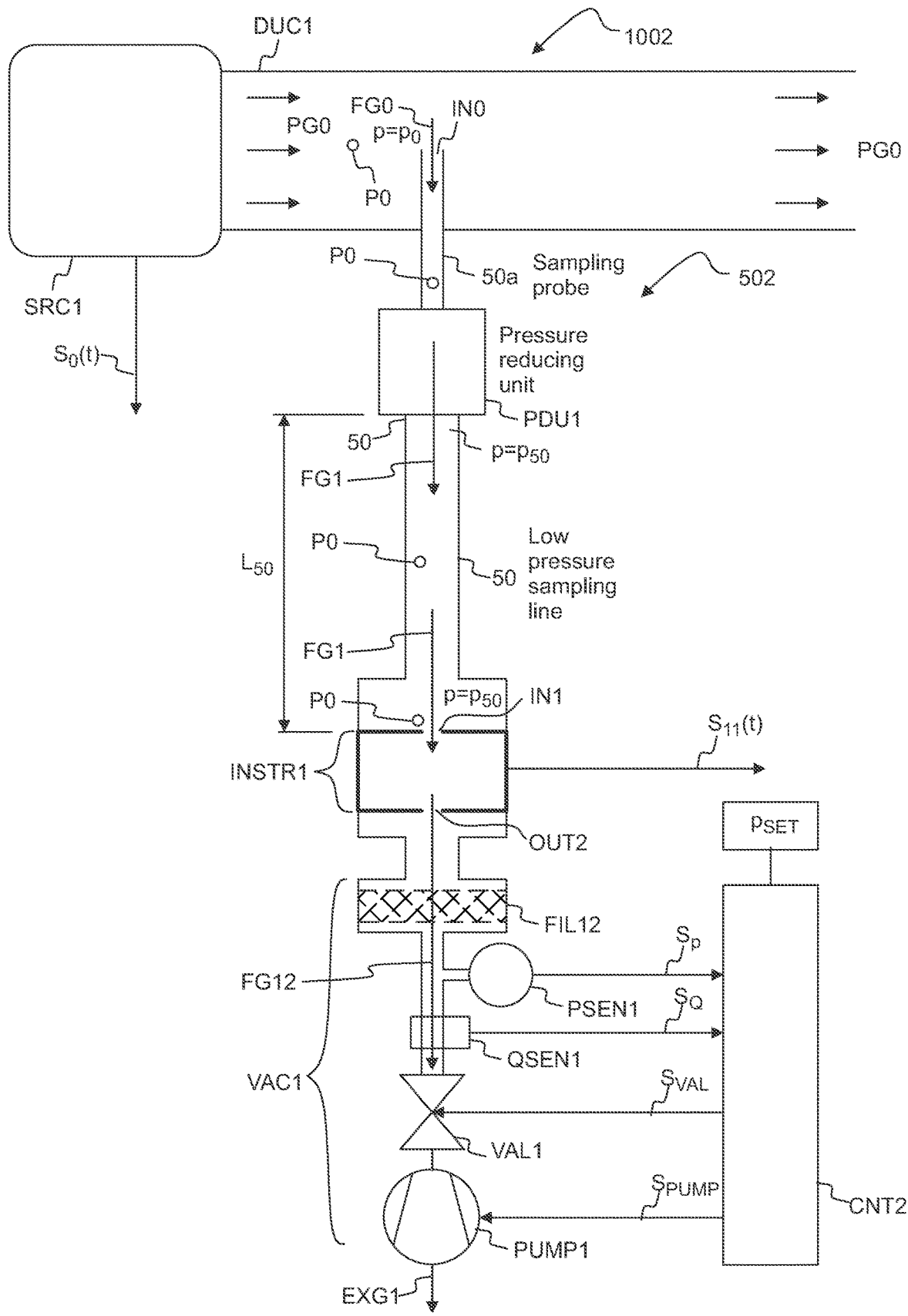
FIG. 8a shows, by way of example, an apparatus for measuring aerosol particles, the apparatus comprising a low-pressure sampling line.
Figure 8B:
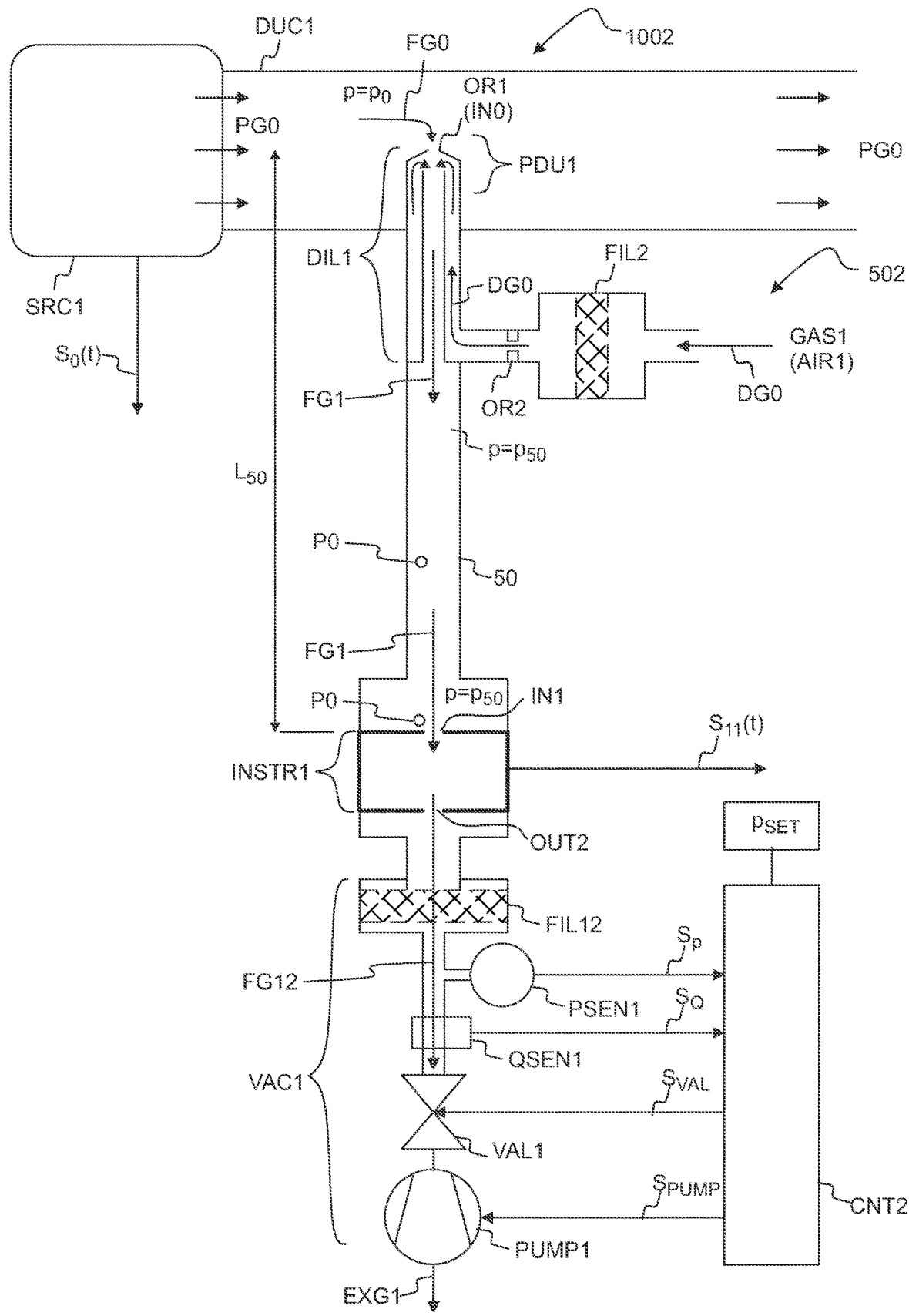
FIG. 8b shows, by way of example, an apparatus for measuring aerosol particles, the apparatus comprising a diluter and a low-pressure sampling line.

The flow rate $Q_1$ of the aerosol flow FG1 may be controlled e.g. by a pump PUMP1 and/or by a valve VAL1 (FIG. 3, FIG. 8b).

The sample flow (FG0, FG1, FG2, FG3) may be guided via a pressure-reducing critical orifice OR1, wherein the flow rate $Q_1$ may be determined e.g. from a downstream pressure of the orifice OR1. The downstream pressure of the orifice OR1 may be e.g. substantially equal to the internal pressure $p_2$. The flow rate $Q_1$ may remain substantially constant e.g. in a situation where the pressure of the primary aerosol PG0 remains substantially constant and the internal pressure ($p_2$) is kept substantially constant. In particular, the pressure ratio $p_2/p_0$ may be smaller than 0.5 in order to ensure choked (critical) flow via the critical orifice OR1.

The apparatus 500 may optionally comprise a flow sensor QSEN1 (FIG. 8b) for monitoring the flow rate of the flow (FG0, FG1, FG2, FG3, FG4, FG5, FG6).

The suction unit VAC1 may provide an exhaust flow EXG1. The exhaust flow EXG1 may be discharged e.g. into the ambient air outside the apparatus 500, or into a ventilation duct.

The collector elements E3 of the collecting unit 200 may be arranged to operate at reduced internal pressure $p_2$. The internal pressure $p_2$ may be e.g. smaller than or equal to 80 kPa, smaller than or equal to 50 kPa, or even smaller than or equal to 20 kPa.

A lower limit of the internal pressure $p_2$ of the collecting unit 200 may be e.g. 2 kPa (20 mbar). The apparatus 500 may be arranged to operate such that the internal pressure $p_2$ is e.g. greater than or equal to 2 kPa. The internal pressure $p_2$ may be e.g. in the range of 2 kPa to 80 kPa. The internal pressure $p_2$ may be e.g. in the range of 2 kPa to 50 kPa. The internal pressure $p_2$ may be e.g. in the range of 2 kPa to 20 kPa.

The pressure reducing unit PDU1 may comprise e.g. one or more orifices OR1 for causing a pressure difference ($p_0$–$p_2$) between an initial pressure $p_0$ of the exhaust duct DUC1 and an internal pressure $p_2$ of the collecting unit 200, in a situation where an aerosol sample flow (FG0, FG1, FG2, FG3) is guided via the one or more orifices OR1. A pressure reducing orifice OR1 may be positioned e.g. at an input end (IN0) of the sampling line 50, between a sampling line 50 and the charging unit 100, between the charging unit 100 and the ion trap TRAP1, or between the ion trap TRAP1 and the collecting unit 200.

The collecting unit 200 may provide a detector current $I_1(t)$ indicative of the instantaneous number density of the particles. A primary electric current $I_1(t)$ formed by collecting the charge from the particles may be very weak. The magnitude of the detector current $I_1(t)$ may be e.g. in the order of a few femtoamperes. The apparatus 500 may comprise a current monitoring unit CMU1 to convert the detector current $I_1(t)$ into a detector signal $S_1(t)$. The apparatus may comprise e.g. an electrometer for measuring the magnitude of the primary electric current $I_1(t)$. The current monitoring unit CMU1 may comprise e.g. an electrometer for measuring the electric current $I_1(t)$ obtained from the collecting unit 200. The detector signal $S_1(t)$ may be indicative of the magnitude of the detector current $I_1(t)$. The detector signal $S_1(t)$ may be substantially proportional to the electric current $I_1(t)$. The detector signal $S_1(t)$ may be e.g. a digital signal to facilitate signal processing.

The apparatus 500 may comprise a signal processing unit CNT1 to form a number density value $N_0(t)$ from the detector signal $S_1(t)$ based on calibration data CAL1. The determined number density value $N_0(t)$ may be e.g. indicative of a number density $n_0(t)$ of the aerosol sample flow (FG0, FG1). The determined number density value $N_0(t)$ may be e.g. indicative of a number density of particles of the primary aerosol PG0.

The calibration data CAL1 may comprise e.g. a proportionality constant for calculating a number density value $N_0(t)$ from the detector signal $S_1(t)$. The calibration data CAL1 may comprise e.g. a proportionality constant for calculating a number density value $N_0(t)$ from a measured detector current $I_1(t)$.

The apparatus 500 may comprise a voltage supply VSU1 for providing an operating voltage V1 for the charging unit 100. A terminal (e.g. T1 or T2) of the voltage supply VSU1 may be directly or indirectly connected to an electrical ground GND1 of the apparatus 500, so as to stabilize an electric potential of the charging unit 100.

The apparatus 500 may comprise a voltage supply VSU2 for providing an operating voltage V5 for the ion trap TRAP1. A terminal T5, T6 of the voltage supply VSU2 may be directly or indirectly connected to an electrical ground GND1 of the apparatus 500, so as to stabilize an electric potential of the ion trap TRAP1. In an embodiment, the charging unit 100 and the ion trap TRAP1 may also receive operating voltage from the same voltage supply (VSU1).

The aerosol source SRC1 may be e.g. an internal combustion engine. The duct DUC1 may be e.g. an exhaust gas duct of the engine. The primary aerosol PG0 may be e.g. exhaust gas of the engine. The primary aerosol PG0 may be e.g. exhaust gas of a gas turbine.

The aerosol source SRC1 may comprise e.g. an internal combustion engine. The aerosol source SRC1 may comprise e.g. a combination of an internal combustion engine and a catalytic converter unit, for controlling and/or reducing emissions.

The internal combustion engine may use e.g. natural gas, synthetic gas, gasoline, diesel fuel, fuel oil and/or alcohol as the fuel during a particle emission test. The sample flow FG0 may be taken e.g. before or after gas cleaning unit of the engine. The gas cleaning unit may comprise e.g. a catalytic converter and/or a gas cleaning filter.

The electric current $I_1(t)$ obtained from the collecting unit 100 of the apparatus 500 may be used e.g. for checking whether particle emissions from an engine are smaller than a predetermined limit (LIM1). The limit may be specified e.g. in a standard and/or in an official regulation. A number density value may be calculated from the measured electric current $I_1(t)$. The method may comprise determining a number density value ($n_0$) from the electric current ($I_1$), comparing the determined number density value ($n_0$) with a limit value (LIM1), and determining whether the number density value ($n_0$) is smaller than the limit value (LIM1) or not.

The gas duct DUC1 may be e.g. an exhaust gas duct of an engine SRC1. The duct DUC1 may be a duct of a dilution system, wherein the primary aerosol PG0 may be e.g. diluted exhaust gas of an engine. The duct DUC1 may be e.g. the tunnel of a constant volume sampler (CVT tunnel). The duct DUC1 may comprise diluted exhaust gas. The source SRC1 may also be e.g. a combustion furnace, an incineration furnace, a fluidized bed boiler, an industrial process unit, or a gas turbine. The gas duct DUC1 may be e.g. a flue gas duct of a combustion facility. During a particle collecting period, the apparatus 500 may be optionally kept e.g. in a heated oven e.g. in order to stabilize condensation.

The source SRC1 may optionally provide a process indicator signal $S0(t)$. The method may comprise obtaining a process indicator signal $S0(t)$ indicative of an operating parameter of the engine SRC1. The detector current $I_1(t)$ may be compared with the process indicator signal $S0(t)$ in order to determine whether a change of an operating parameter of the particle source SRC1 corresponds to a change of the detector current $I_1(t)$.

The apparatus 500 may be used e.g. for measuring particle emissions from an engine SRC1. The engine may be driven according to first test procedure. The first test procedure may comprise e.g. adjusting a control signal of the engine (e.g. the gas pedal position), and/or the load of the engine (i.e. the output power) according to a predetermined sequence. The measured detector current $I_1(t)$ and/or the measured particle number density $n_0(t)$ may be compared with the process indicator signal $S0(t)$ in order to determine whether the detector current $I_1(t)$ correlates with the process indicator signal $S0(t)$. The process indicator signal $S0(t)$ may be e.g. indicative of fuel flow rate, input air flow rate to an engine, operating temperature of an engine, operating temperature of a cylinder of an engine, operating temperature of a catalytic converter, operating temperature of a filter, operating temperature of a process, gas pedal setting, valve timing of an engine, fuel feeding pressure, rotation speed of a dynamometer coupled to the engine, torque of an engine, power transferred from an engine to a dynamometer, or flow rate of an additive. The aerosol particle source SRC1 may simultaneously provide a plurality of process indicator signals, which may be indicative of different operating parameters of the source SRC1.

In general, the units of the apparatus 500 may be arranged such that the collecting unit 200 may receive charged particles from the charging unit 100, and such that the internal pressure $p_2$ of the collecting unit 200 may be substantially lower than the ambient pressure $p_0$. The collecting unit 200 may be positioned downstream of the charging unit 100 and downstream of the pressure reducing unit PDU1.

The apparatus 500 may optionally comprise a modifier unit MOD1 to modify size distribution of the aerosol sample flow. The modifier unit MOD1 may e.g. remove particles larger than a predetermined limit ($d_{cut}$). The modifier unit MOD1 may be positioned upstream of the collecting unit 200. The modifier unit MOD1 may be positioned e.g. upstream of the charging unit 100 or between the charging unit 100 and the collecting unit 200.

Figure 1B:
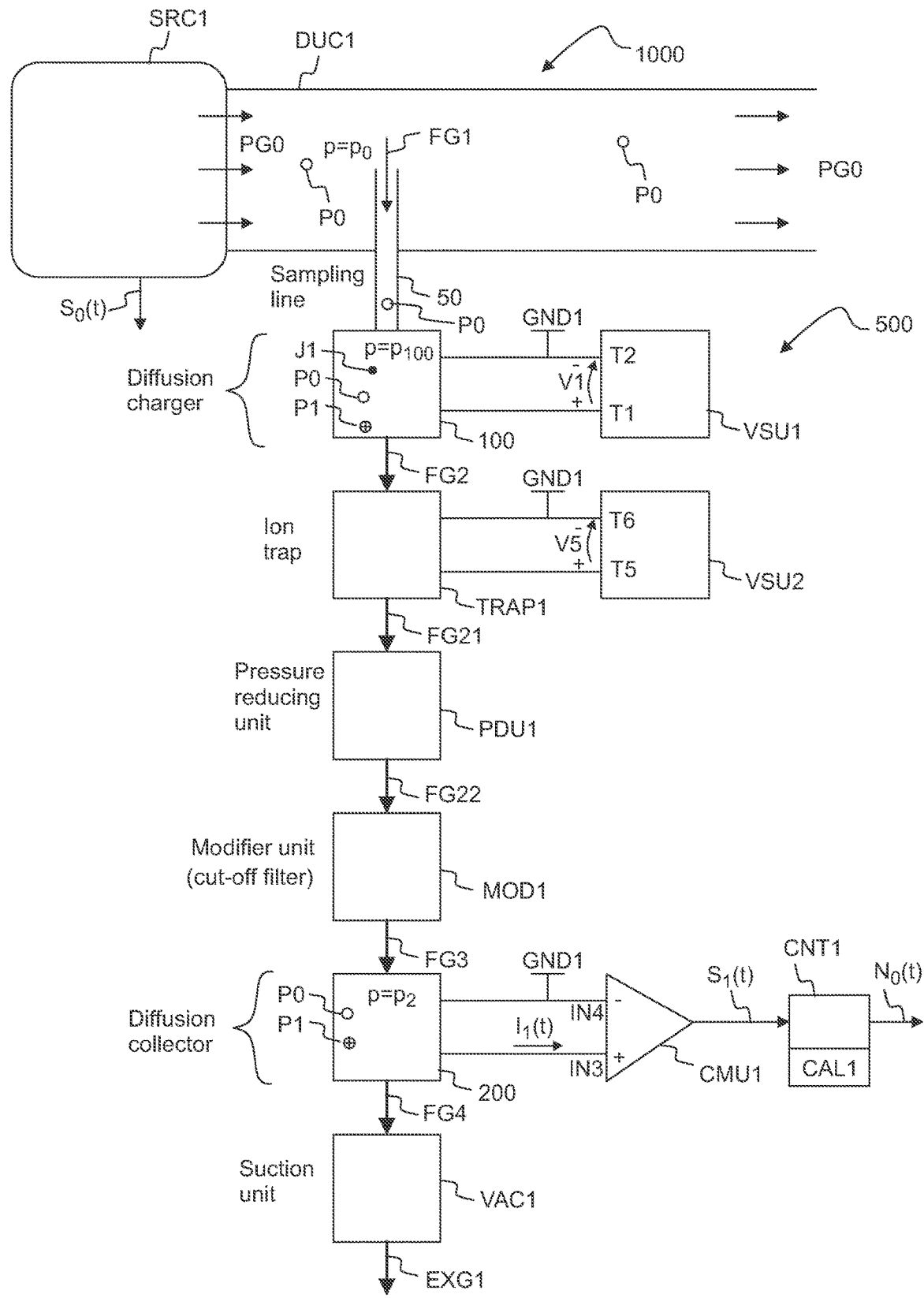
FIG. 1b shows, by way of example, an apparatus for measuring number density of aerosol particles.

Referring to FIG. 1b, the pressure reducing unit PDU1 may be positioned e.g. between the charging unit 100 and the collecting unit 200. The charging unit 100 may receive an aerosol sample flow FG1. The charging unit 100 may provide an aerosol sample flow FG2, which comprises charged particles P1. An ion trap TRAP1 may provide an aerosol sample flow FG21 by removing ions from the flow FG2. The pressure reducing unit PDU1 may provide an aerosol sample flow FG22 by reducing pressure of the flow FG2. The modifier unit MOD1 may provide an aerosol sample flow FG3 by modifying size distribution of the flow FG22. The collecting unit 200 may collect charges from charged particles of the flow FG3.

FIGS. 2a to 2d illustrate, by way of example, how the response of the apparatus 500 to particles P0 of different sizes may be adjusted by selecting operating pressure ($p_2$) of the collecting unit 200. The apparatus 500 may be arranged to keep the internal pressure ($p_2$) of the collecting unit 200 substantially equal to a selected pressure value $p_{SET}$.

Figure 2A:
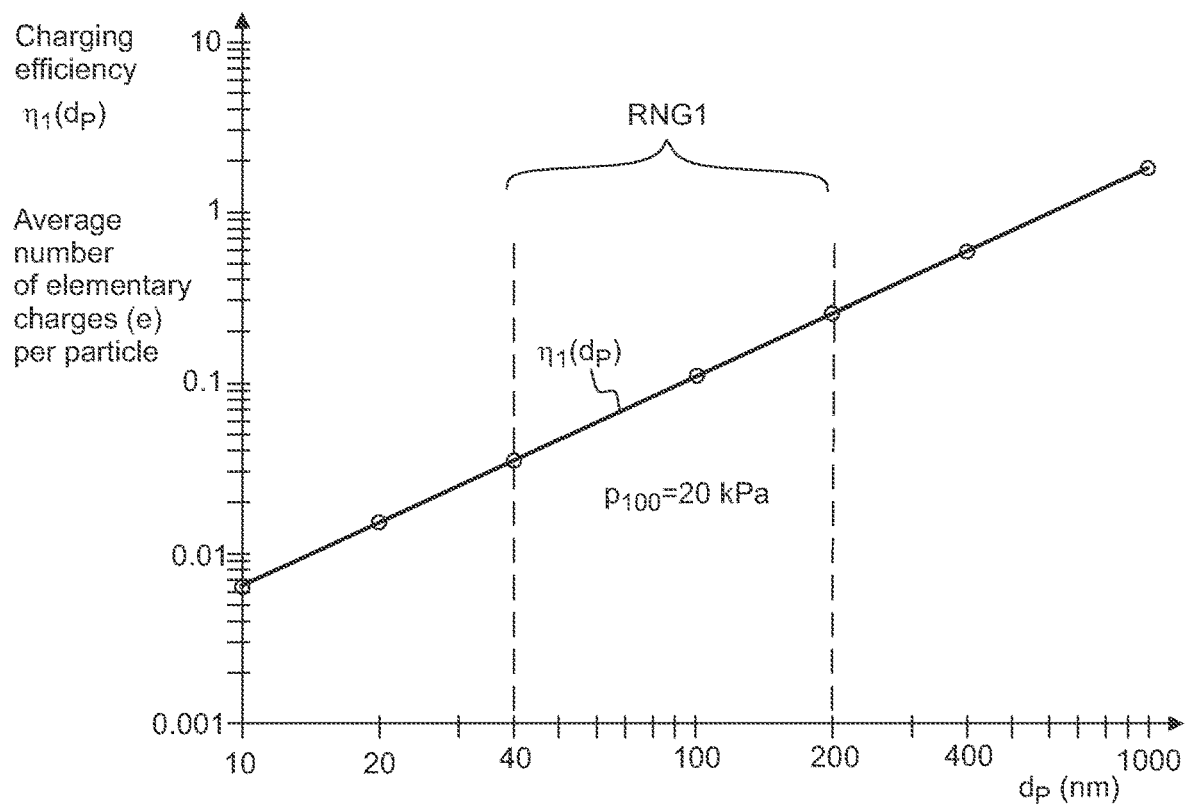
FIG. 2a shows, by way of example, efficiency for charging particles by diffusion charging.

FIG. 2a shows, by way of example, an efficiency $\eta_1(d_p)$ for charging aerosol particles by diffusion charging, as a function of mobility size $d_p$ of the aerosol particles P0 of the aerosol sample flow. The aerosol particles P0 may be initially neutral or they may carry an initial charge. Forming charged aerosol particles P1 from the initial aerosol particles P0 by the diffusion charging may provide an aerosol sample flow FG2 according to the charging efficiency $\eta_1(d_p)$. The charging efficiency $\eta_1(d_p)$ may be indicative of an average number of elementary charges (e) per particle in the aerosol sample flow FG2, which is provided from an output of the charging unit. The charging efficiency $\eta_1(d_p)$ may represent the particle population of the aerosol sample flow FG2. The charge of each individual particle may exhibit statistical variation.

The charging efficiency function $\eta_1(d_p)$ may be e.g. indicative of the average number of elementary charges per particle as a function of the mobility size of the particle. The elementary charge (e) is equal to $1.602 \cdot 10^{-19}$ As (As=ampere second).

The curve of FIG. 2a shows, by way of example, the charging efficiency function $\eta_1(d_p)$ in a situation where the internal pressure $p_{100}$ of the charging unit 100 is 20 kPa.

Figure 2B:
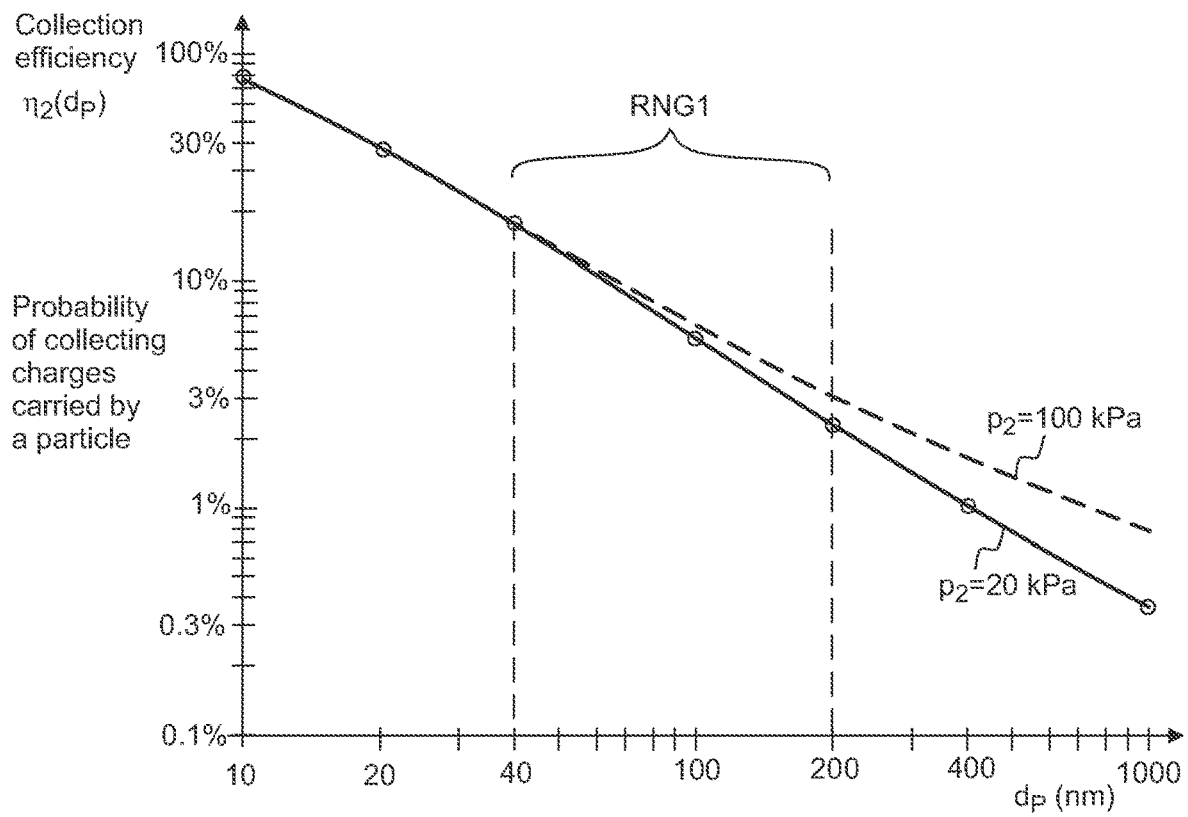
FIG. 2b shows, by way of example, efficiency for collecting charge from charged particles by diffusion.

FIG. 2b shows, by way of example, the collecting efficiency $\eta_2(d_p)$ for collecting charges, as a function of mobility size $d_p$ of the aerosol charged particles P1, in a situation where the charges from the charged particles P1 are collected by diffusion of the charged particles P1. The collecting efficiency $\eta_2(d_p)$ may be indicative of a probability of collecting the charge of a particle of mobility size $d_p$. The collecting efficiency $\eta_2(d_p)$ may be in the range of 0% to 100%, depending on the particle size $d_p$.

For example, the collecting efficiency $\eta_2(d_p=40\ nm)$ may be substantially equal to 1%, which means that the probability of collecting charges of 40 nm particles P1 may be substantially equal to 1%.

A probability for a particle P1 of size $d_p$ to pass through the collecting unit 200 without transferring the charge to the collecting unit may be equal to $1-\eta_2(d_p)$, respectively. For example, the probability for a particle of 40 nm to pass through the collecting unit without transferring the charge to the collecting unit may be equal to $100\%-\eta_2(d_p=40\ nm)$, respectively.

A collecting efficiency $\eta_2(d_p)$ of 0% may indicate that all particles of size $d_p$ pass through the collecting unit 200 without transferring charge. A collecting efficiency $\eta_2(d_p)$ of 50% may indicate that 50% of particles of size $d_p$ pass through the collecting unit 200 without transferring charge, and 50% of particles of size $d_p$ transfer charge to the collecting unit 200. A collecting efficiency $\eta_2(d_p)$ of 100% may indicate that substantially all particles of size $d_p$ transfer charge to the collecting unit 200.

The solid curve of FIG. 2b represents the collecting efficiency $\eta_2(d_p)$ when the internal pressure $p_2$ of the collecting unit is equal to 20 kPa. The dashed curve of FIG. 2b represents the collecting efficiency $\eta_2(d_p)$ when the internal pressure $p_2$ is equal to 100 kPa. The shape of the collecting efficiency $\eta_2(d_p)$ may depend on the internal pressure $p_2$ of the collecting unit 200. The slope ($\Delta\eta_2/\Delta d_p$) of the collecting efficiency function $\eta_2(d_p)$ at a given particle size (e.g. $d_p=40$ nm) may depend on the internal pressure $p_2$ of the collecting unit 200.

The charged particles P1 move in the vicinity of a collecting element E3 by diffusion until some of the charged particles P1 contact the collecting element E3. A charged particle P1 may transfer charge to the collecting element E3 (only) when it contacts the collecting element E3. The charge transferred, i.e. collected from the charged particle P1 to the collecting element E3 may contribute to the detector current $I_1(t)$ of the collecting unit 200.

The collecting unit may collect charge of the charged particles e.g. by collecting charged particles by diffusion. The collecting unit does not need to collect the particles permanently. The collecting unit may provide a net electric current also in a situation where the collected particles are subsequently released back into the gas flow as electrically neutral particles.

The collecting unit may be arranged to operate such that the probability of collecting a charged particle is substantially smaller than 100% at the particle size of a 100 nm, so as to provide a negative slope of the collecting efficiency $\eta_2(d_p)$.

The reduced internal pressure $p_2$ of the collecting unit 200 may enhance diffusion by reducing aerodynamic drag of particles smaller than 1000 nm. The internal pressure $p_2$ may have an effect on the shape of the collecting efficiency curve $\eta_2(d_p)$ also by reducing the aerodynamic drag.

Figure 2C:
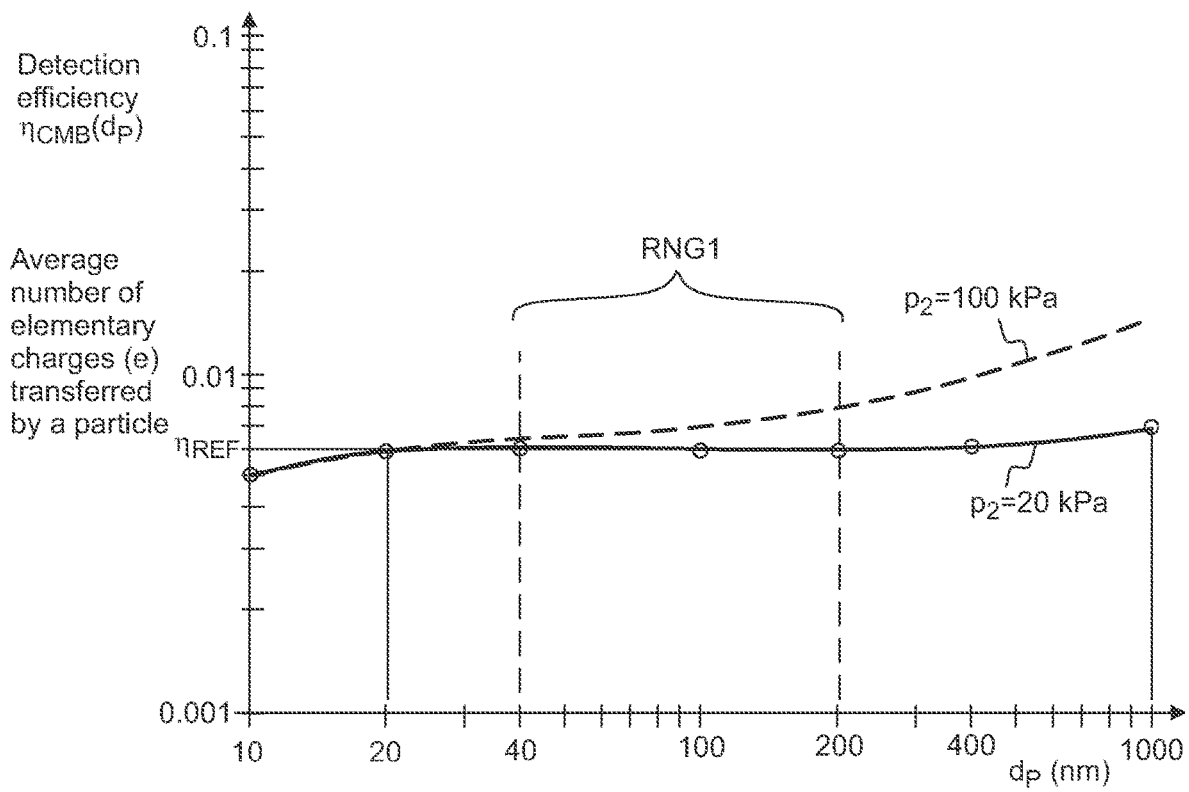
FIG. 2c shows, by way of example, a combined efficiency for detecting particles when charging particles by diffusion charging and collecting charge from the charged particles by diffusion.

FIG. 2c shows, by way of example, a combined efficiency $\eta_{CMB}(d_p)$ for detecting particles as a function of mobility size $d_p$ of the aerosol particles P0, in a situation where the particles P0 are charged by diffusion charging, and wherein charges of the charged particles are collected by diffusion collecting. The combined detection efficiency $\eta_{CMB}(d_p)$ may be determined as a product of the efficiencies, i.e. $\eta_{CMB}(d_p) = \eta_1(d_p) \cdot \eta_2(d_p)$. The combined efficiency $\eta_{CMB}(d_p)$ may include the contribution of charging particles in the charging unit 100 and the contribution of collecting charge of the particles in the collecting unit 200.

The combined detection efficiency ($\eta_{CMB}(d_p)=\eta_1(d_p)\cdot\eta_2(d_p)$) may be indicative of an average number of elementary charges (e) transferred by each particle (P0) of size $d_p$ of the aerosol sample flow (FG1) from the charging unit 100 to the one or more collecting elements of the collecting unit 200. The combined detection efficiency $\eta_{CMB}(d_p)$ may take into account the contribution of the average number of elementary charges (e) transferred to each particle (P0) of size $d_p$ of the aerosol sample flow (FG1) in the charging unit 100, and the combined detection efficiency $\eta_{CMB}(d_p)$ may also take into account the contribution of the probability of collecting the charge of the charged particle in the collecting unit 200.

A change ($\Delta p_2$) of the internal pressure ($p_2$) of the collecting unit (200) may have an effect on the slope ($\Delta\eta_2/\Delta d_p$) of the collecting efficiency function ($\eta_2(d_p)$) in a predetermined size range RNG1, e.g. in a size range of 40 nm to 200 nm. The slope ($\Delta\eta_{CMB}/\Delta d_p$) of the combined detection efficiency $\eta_{CMB}(d_p)$ may be tailored by selecting the internal pressure ($p_2$) of the collecting unit (200).

An optimum shape of the combined detection efficiency $\eta_{CMB}(d_p)$ may be selected by selecting the target value ($p_{SET}$) of the internal pressure $p_2$. For example, the internal pressure ($p_2$) of the collecting unit (200) may be selected such that a negative slope ($\Delta\eta_2/\Delta d_p$) of the collecting efficiency function ($\eta_2(d_p)$) at least partly compensates a positive slope ($\Delta\eta_1/\Delta d_p$) of the charging efficiency function ($\eta_1(d_p)$) at least in the particle size range of 40 nm to 200 nm.

For example, the internal pressure ($p_2$) of the collecting unit (200) may be kept at a predetermined selected value ($p_{SET}$) such that the slope ($\Delta\eta_{CMB}/\Delta d_p$) of the combined detection efficiency $\eta_{CMB}(d_p)$ is substantially equal to zero in the size range of 40 nm to 200 nm.

The internal pressure ($p_{100}$) of the charging unit 100 may be substantially equal to the internal pressure ($p_2$) of the collecting unit 200, or the internal pressure ($p_{100}$) of the charging unit 100 may be different from the internal pressure ($p_2$) of the collecting unit 200.

The internal pressure ($p_{100}$) of the charging unit 100 may be substantially equal to the internal pressure ($p_2$) of the collecting unit 200. For example, the charging unit 100 and the collecting unit 200 may be positioned downstream of the pressure reducing unit PDU1 such that the internal pressure ($p_{100}$) of the charging unit 100 may be substantially equal to the internal pressure ($p_2$) of the collecting unit 200.

The internal pressure ($p_2$) of the collecting unit 200 may also be substantially lower than the internal pressure ($p_{100}$) of the charging unit 100. For example, the pressure reducing unit PDU1 may be positioned between the charging unit 100 and the collecting unit 200.

A change of the internal pressure ($p_{100}$) of the charging unit 100 may have an effect on the charging efficiency $\eta_1(d_p)$, and a change of the internal pressure ($p_2$) of the collecting unit 200 may have an effect on the collecting efficiency $\eta_2(d_p)$. An effect of the internal pressure ($p_{100}$) on the charging efficiency $\eta_1(d_p)$ may be different from an effect of the internal pressure ($p_2$) on the collecting efficiency $\eta_2(d_p)$. Consequently, the combined detection efficiency $\eta_{CMB}(d_p)$ may be tailored by selecting the internal pressure ($p_2$) of the collecting unit 200 also in a situation where the internal pressure ($p_{100}$) of the charging unit 100 is substantially equal to the internal pressure ($p_2$) of the collecting unit 200. The combined detection efficiency $\eta_{CMB}$ ($d_p$) may be tailored at least in the size range RNG1 by selecting the internal pressure ($p_2$) of the collecting unit 200.

By way of example, the solid curve of FIG. 2c may represent the combined detection efficiency $\eta_{CMB}(d_p)$ when the internal pressure $p_2$ is equal to 20 kPa. The dashed curve of FIG. 2c may represent the combined detection efficiency $\eta_{CMB}(d_p)$ when the internal pressure $p_2$ is equal to 100 kPa.

Figure 2D:
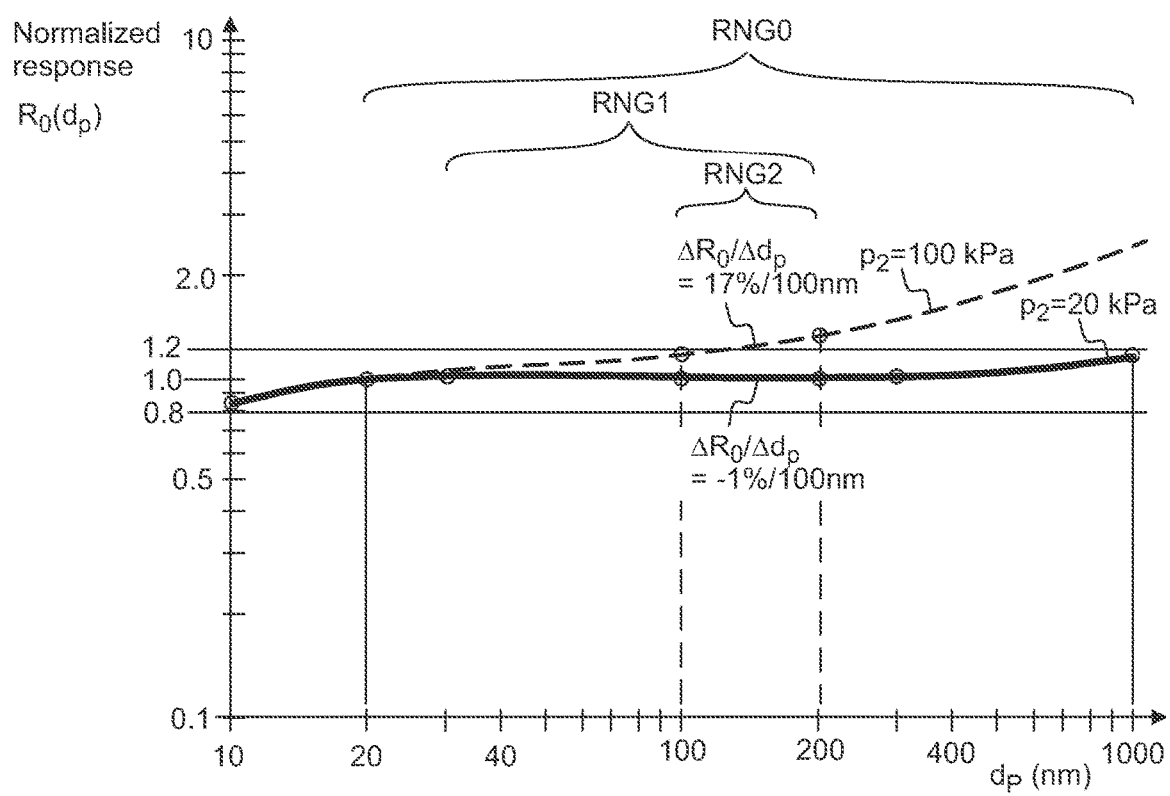
FIG. 2d shows, by way of example, normalized response for detecting particles of different sizes.

FIG. 2d shows normalized response functions $R_0$, which have been obtained by dividing the combined detection efficiency $\eta_{CMB}(d_p)$ with a reference value $\eta_{REF}$. The solid curve shows the normalized response function $R_0$ in a situation where the internal pressure $p_2$ is equal to 20 kPa. The dashed curve shows the normalized response function $R_0$ in a situation where the internal pressure $p_2$ is equal to 100 kPa. The curves of FIG. 2d have been normalized by dividing the combined detection efficiency $\eta_{CMB}(d_p)$ with a reference value $\eta_{REF}$. The reference value $\eta_{REF}$ may be equal to the combined detection efficiency at a predetermined particle size (e.g. 20 nm or 100 nm).

The combined detection efficiency $\eta_{CMB}(d_p)$ may be substantially independent of particle size e.g. in the size range of 40 nm to 200 nm. For example, an efficiency $\eta_{CMB}(d_p)$ of detecting particles (P0) having a mobility size ($d_p$) of 40 nm may be e.g. in the range of 0.8 to 1.2 times the efficiency $\eta_{CMB}(d_p)$ of detecting particles (P0) having a mobility size ($d_p$) of 100 nm, and an efficiency $\eta_{CMB}(d_p)$ of detecting particles (P0) having a mobility size ($d_p$) of 200 nm may be e.g. in the range of 0.8 to 1.2 times the efficiency $\eta_{CMB}(d_p)$ of detecting particles (P0) having a mobility size ($d_p$) of 100 nm.

The combined detection efficiency $\eta_{CMB}(d_p)$ may be substantially independent of particle size e.g. in the size range of 40 nm to 200 nm. For example, an efficiency ($\eta_{CMB}$) of detecting particles (P0) having a mobility size ($d_p$) of 40 nm may be e.g. in the range of 0.9 to 1.1 times the efficiency ($\eta_{CMB}$) of detecting particles (P0) having a mobility size ($d_p$) of 100 nm, and an efficiency $\eta_{CMB}(d_p)$ of detecting particles (P0) having a mobility size ($d_p$) of 200 nm may be e.g. in the range of 0.9 to 1.1 times the efficiency $\eta_{CMB}(d_p)$ of detecting particles (P0) having a mobility size ($d_p$) of 100 nm.

The internal pressure value ($p_2$) of the collecting unit 200 may be kept at a predetermined pressure value ($p_{SET}$). The pressure value ($p_{SET}$) may be selected such that the combined efficiency function $\eta_{CMB}(d_p)$ may be substantially flat according to one or more of the criterions listed above.

The charging efficiency $\eta_1(d_p)$ may decrease with increasing particle size in a first size range (RNG1). The first size range (RNG1) may be e.g. the range from the particle size 40 nm to 200 nm. The decreasing charging efficiency function may be approximated by a first exponential function in said first size range (RNG1):

$$\eta_1(d_p) \approx k_1 \cdot (d_p)^{\alpha} \tag{1}$$

$k_1$ denotes a proportionality constant. $d_p$ denotes mobility size of aerosol particle. $\alpha$ denotes the exponent. In case of diffusion charging, the exponent $\alpha$ may be e.g. in the range of 1.05 to 1.50 in the size range RNG1. In case of diffusion charging by a triode charger (FIG. 7b), the exponent $\alpha$ may be e.g. substantially equal to 1.1 in the size range RNG1.

The collecting efficiency $\eta_2(d_p)$ may decrease with increasing particle size in the first size range (RNG1). The increasing charging efficiency function may be approximated by a second exponential function in said size range (RNG1):

$$\eta_2(d_p) \approx k_2 \cdot (d_p)^{-\beta} \tag{2}$$

$k_2$ denotes a proportionality constant. $-\beta$ denotes the exponent. The value of the exponent $-\beta$ may be e.g. in the range of $-1.00$ to $-0.85$ in the size range RNG1.

The combined detection efficiency $\eta_{CMB}(d_p)$ for the combination of the charging unit 100 and the collecting unit 100 may be formed as the product of the charging efficiency $\eta_1(d_p)$ and the collecting efficiency $\eta_2(d_p)$:

$$\eta_{CMB}(d_p)=\eta_1(d_p)\cdot\eta_2(d_p) \quad (3)$$

Based on the equations (1), (2), (3), the combined detection efficiency $\eta_{CMB}(d_p)$ may be approximated by a product of the exponential functions:

$$\eta_{MB}(d_p)\approx k_1\cdot(d_p)^\alpha k_2\cdot(d_p)^{-\beta} \quad (4a)$$

$$\eta_{CMB}(d_p)\approx k_1\cdot k_2(d_p)^{\alpha-\beta} \quad (4b)$$

A low value of the difference $\alpha-\beta$ may correspond to an operating condition where the particle size $d_p$ has a small or negligible effect on the number count response of the measuring apparatus 500. The internal pressure $p_2$ of the collecting unit 200 may be selected such that the difference $\alpha-\beta$ is e.g. in the range of 0 to 0.65.

The internal pressure $p_2$ of the collecting unit 200 may have an effect on the exponent 13. The internal pressure $p_{100}$ of the charging unit 100 may have a smaller effect and/or different effect on the exponent $\alpha$. The internal pressure $p_2$ of the collecting unit 200 may be selected e.g. such that the exponent 13 is substantially equal to the exponent $\alpha$. The combined detection efficiency $\eta_{CMB}(d_p)$ may be substantially independent of the particle size $d_p$ in the first size range (RNG1) in a situation where the pressure has been selected such that the exponent 13 is substantially equal to the exponent $\alpha$. The internal pressure $(p_{100})$ of the charging unit 100 may be e.g. substantially equal to the internal pressure $(p_2)$ of the collecting unit 200.

In an embodiment, the apparatus may also be arranged to operate such that the internal pressure $p_2$ of the collecting unit 200 is different from the internal pressure $p_{100}$ of the charging unit 100.

Figure 2E:
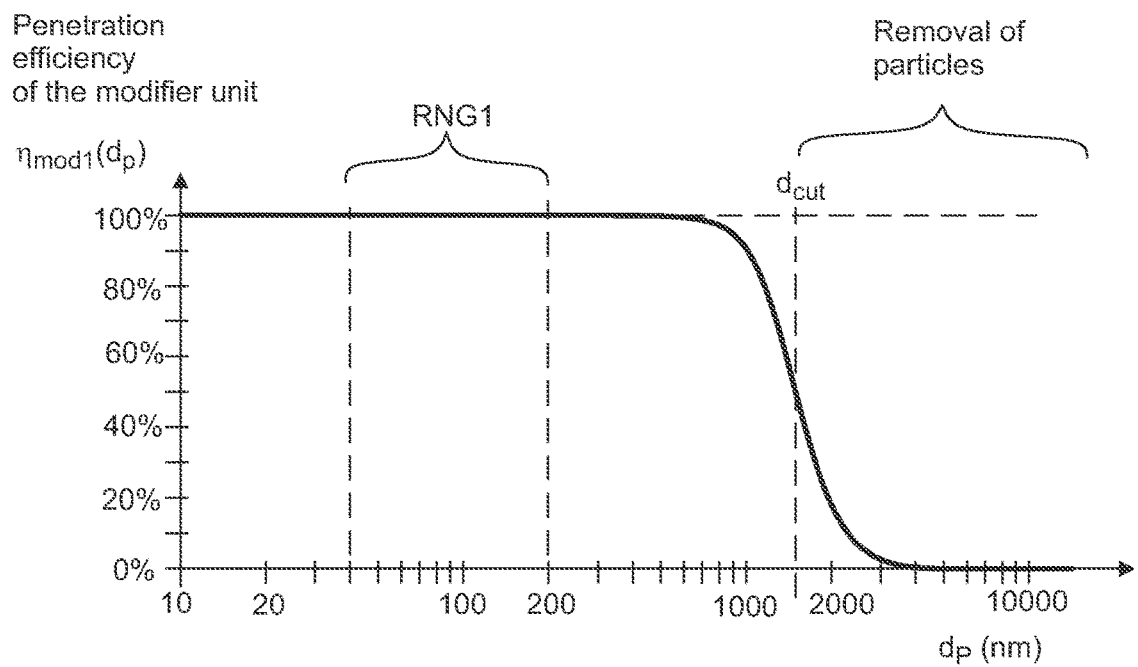
FIG. 2e shows, by way of example, penetration efficiency of a size distribution modifying unit.
Figure 2F:
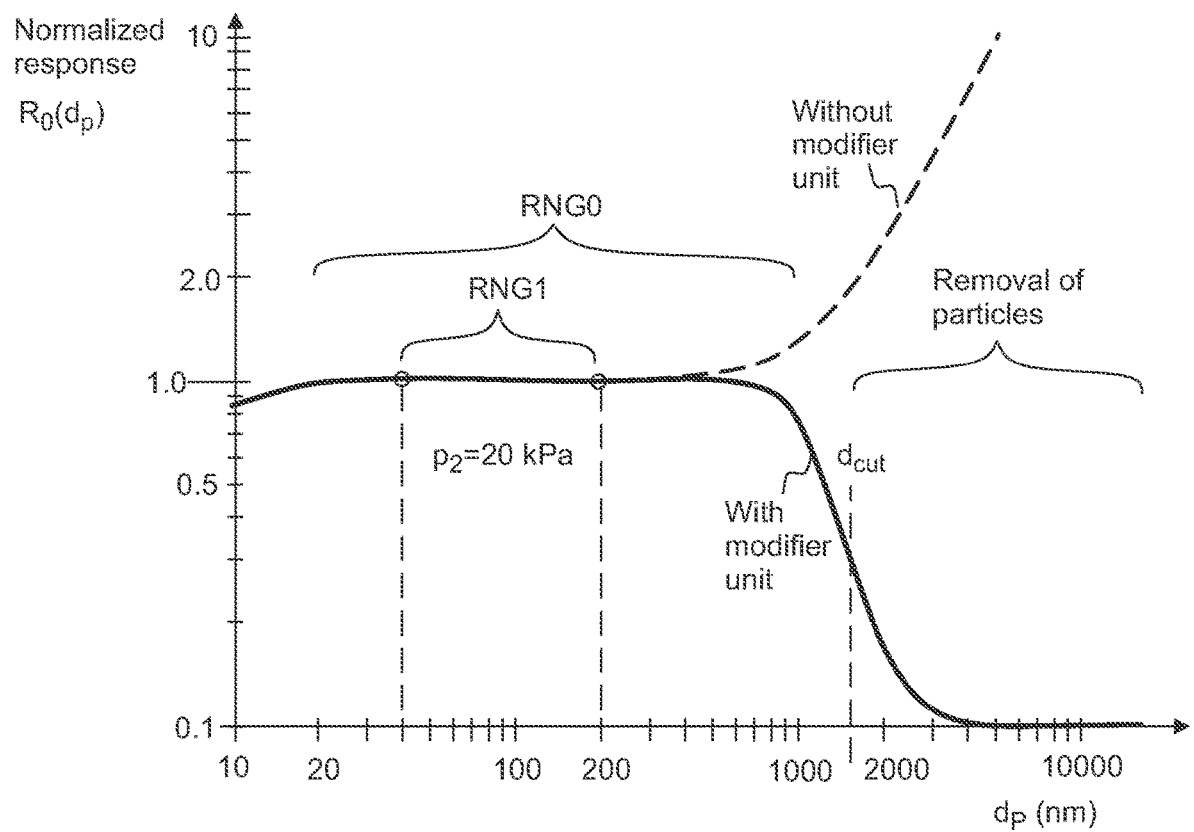
FIG. 2f shows, by way of example, normalized response with and without a modifying unit.

Referring to FIG. 2e, the apparatus 500 may optionally comprise one or more modifier units MOD1 to modify the particle size distribution of the aerosol sample flow. The modifier unit MOD1 may be positioned e.g. upstream of the charging unit 100, or between the charging unit 100 and the collecting unit 200. The modifier unit MOD1 may comprise e.g. a filter, an impactor and/or a cyclone to modify the particle size distribution of the aerosol sample flow. The modifier unit MOD1 may comprise e.g. a filter, an impactor and/or a cyclone to remove particles from the aerosol sample flow according to a predetermined penetration efficiency function $\eta_{MOD1}(d_p)$. The penetration efficiency $\eta_{MOD1}(d_p)$ may have e.g. a cut-off size $d_{CUT}$ to eliminate particles larger than the cut-off size $d_{CUT}$ from the aerosol sample flow so that the removed particles cannot transfer charge from the charging unit 100 to the collecting unit 200. The penetration efficiency $\eta_{MOD1}(d_p)$ may be indicative of a probability of a particle of size $d_p$ to pass through the modifier unit MOD1. The penetration efficiency $\eta_{MOD1}(d_p)$ may be substantially equal to 100% for the size range RNG1 (e.g. from 40 nm to 200 nm) where substantially all particles may pass through the modifier unit MOD1. The penetration efficiency $\eta_{MOD1}(d_p)$ may be lower than 50% for particles larger than the cut-off size $d_{CUT}$. The penetration efficiency $\eta_{MOD1}(d_p)$ may be substantially equal to 0% in a size range where the modifier unit MOD1 removes substantially all particles.

The total detection efficiency $\eta_{tot}(d_p)$ of the apparatus 500 may be formed as the product of the penetration efficiency $\eta_{MOD1}(d_p)$, the charging efficiency $\eta_1(d_p)$ and the collecting efficiency $\eta_2(d_p)$:

$$\eta_{tot}(d_p)=\eta_{MOD1}(d_p)\cdot\eta_1(d_p)\cdot\eta_2(d_p) \quad (4c)$$

$$\eta_{tot}(d_p)=\eta_{MOD1}(d_p)\eta_{CMB}(d_p) \quad (4d)$$

The modifier unit MOD1 may be arranged to remove particles from the aerosol sample flow e.g. by impaction and/or by interception. Selecting the internal pressure $(p_2)$ of the collecting unit 200 may be used for tailoring the slope of the total detection efficiency $\eta_{tot}(d_p)$ e.g. in the size range RNG1 from 40 nm to 200 nm, whereas the impaction and/or by interception mechanisms may be used for tailoring the total detection efficiency $\eta_{tot}(d_p)$ for larger particles which are outside said size range RNG1.

The detector current $I_1(t)$ obtained from the collecting unit 200 may be proportional to the particle number density $n_0(t)$ of the aerosol sample flow FG1, proportional to the flow rate $Q_1$ of the aerosol sample flow FG1, and proportional to the total detection efficiency $\eta_{tot}(d_p)$. t denotes time. $k_0$ denotes a proportionality constant.

$$I_1(t)=k_0\cdot Q1\cdot\eta_{tot}(d_p)\cdot n_0(t) \quad (5)$$

The response $R_1(d_p)$ of the electric current $I_1$ to particle density no of a monodisperse distribution of size $d_p$ may be defined e.g. as follows:

$$R_1(d_P) = \frac{I_1(d_P)}{n_0(d_P)} \quad (6)$$

Combining (5) and (6) may allow calculating the response $R_1(d_p)$ from the total detection efficiency $\eta_{tot}(d_p)$ e.g. as follows:

$$R_1(d_P)=k_0\cdot Q1\cdot\eta_{tot}(d_P) \quad (7)$$

Thus, the response $R_1(d_p)$ may be proportional to the total detection efficiency $\eta_{tot}(d_p)$. The shape of the response function $R_1(d_p)$ may be similar to the shape of the total detection efficiency $\eta_{tot}(d_p)$. The response $R_1(d_p)$ may be substantially independent of the particle size $d_p$ in the size range RNG1 in a situation where the total detection efficiency $\eta_{tot}(d_p)$ is substantially independent of the particle size $d_p$ in the size range RNG1.

For example, the internal pressure $(p_2)$ of the collecting unit (200) may be selected such that a negative slope $(\Delta\eta_2/\Delta d_p)$ of the collecting efficiency function $(\eta_2(d_p))$ at least partly compensates a positive slope $(\Delta\eta_1/\Delta d_p)$ of the charging efficiency function (To $(d_p)$) at least in the particle size range of 40 nm to 200 nm.

For example, the pressure $(p_2)$ of the collecting unit (200) may be selected such that a response $(R_1(d_p))$ of the electric current $(I_1(t))$ for detecting particles (P0) having a mobility size $(d_p)$ of 200 nm is in the range of 0.9 to 1.1 times a response $(R_1(d_p))$ for detecting particles (P0) having a mobility size $(d_p)$ of 100 nm, and wherein a response $(R_1(d_p))$ of the electric current $(I_1(t))$ for detecting particles (P0) having a mobility size $(d_p)$ of 40 nm is in the range of 0.9 to 1.1 times a response $(R_1(d_p))$ for detecting particles (P0) having a mobility size $(d_p)$ of 100 nm.

For example, the pressure $(p_2)$ of the collecting unit (200) may be selected such that a response $(R_1(d_p))$ of the electric current $(I_1(t))$ for detecting particles (P0) having a mobility size $(d_p)$ of 400 nm is in the range of 0.9 to 1.1 times a response $(R_1(d_p))$ for detecting particles (P0) having a mobility size ($d_p$) of 100 nm, and wherein a response ($R_1(d_p)$) of the electric current ($I_1(t)$) for detecting particles (P0) having a mobility size ($d_p$) of 40 nm is in the range of 0.9 to 1.1 times a response ($R_1(d_p)$) for detecting particles (P0) having a mobility size ($d_p$) of 100 nm.

For example, the pressure of the collecting unit 200 may be selected such that a response ($R_1(d_p)$) for detecting particles (P0) having a mobility size ($d_p$) of 40 nm is in the range of 0.9 to 1.1 times a response ($R_1(d_p)$) for detecting particles (P0) having a mobility size ($d_p$) of 100 nm, and such that a response ($R_1(d_p)$) for detecting particles (P0) having a mobility size ($d_p$) of 1000 nm is in the range of 0.9 to 1.2 times the response ($R_1(d_p)$) for detecting particles (P0) having a mobility size ($d_p$) of 100 nm.

The flow rate $Q_1$ may be kept substantially constant. The total detection efficiency $\eta_{tot}(d_p)$ may be substantially constant in a detection size range RNG0 of the measuring apparatus 500. The detection size range RNG0 may be e.g. from 40 nm to 400 nm. The detection size range RNG0 may be e.g. from 40 nm to 1000 nm. The constant $k_0$, the flow rate $Q_1$, and the total detection efficiency $\eta_{tot}(d_p)$ may be combined and expressed as a calibration constant $K_{CAL}$.

$$K_{CAL} = \frac{1}{k_0 \cdot \eta_{tot} \cdot Q1} \qquad (8)$$

The number density no may be determined from the measured detector current $I_1$ e.g. by using the calibration constant $k_{CAL}$:

$$n_0(t) = K_{CAL} \cdot I_1(t) \qquad (9)$$

The calibration constant $K_{CAL}$ may be determined e.g. by calibration measurements. The calibration constant $K_{CAL}$ may be e.g. stored in a memory (MEM1) of the apparatus. The apparatus 500 may be arranged to determine a number density $n_0(t)$ from the measured current $I_1(t)$ by using the calibration constant $K_{CAL}$. In an embodiment, the measured current $I_1(t)$ may be communicated to an auxiliary computer, and the auxiliary computer may be arranged to determine a number density $n_0(t)$ from the measured current $I_1(t)$ by using the calibration constant $K_{CAL}$.

The number density no means the number of aerosol particles in a unit volume. The number density no may also be called as the number concentration.

Referring to FIG. 2d, the response function $R_1(d_p)$ may be normalized by dividing the response function $R_1(d_p)$ with a reference value $R_{REF}$.

$$R_0(d_P) = \frac{R_1(d_P)}{R_{REF}} \tag{10}$$

The reference value $R_{REF}$ may be e.g. equal to the response $R_1(d_p)$ for the particle size 100 nm.

A substantially flat response function $R_1(d_p)$ and/or substantially flat normalized response function $R_0(d_p)$ may be provided by selecting the internal pressure $p_2$. For example, the response function $R_1(d_p)$, $R_0(d_p)$ may be substantially flat within the limits ±10% at least in the particle size range of 40 nm to 400 nm. For example, the response function $R_1(d_p)$, $R_0(d_p)$ may be substantially flat within the limits ±20% at least in the particle size range of 20 nm to 1000 nm.

The internal pressure ($p_2$) of the collecting unit (200) may be selected such that a negative slope ($\Delta\eta_2/\Delta d_p$) of the collecting efficiency function ($\eta_2(d_p)$) may compensate a positive slope ($\Delta\eta_1/\Delta d_p$) of the charging efficiency function ($\eta_1(d_p)$) in a predetermined size range RNG2.

The negative slope may compensate the positive slope e.g. such that the slope of the normalized response function $R_0(d_p)$ may be e.g. substantially equal to −1%/100 nm in the size range (RNG2) of 100 nm to 200 nm, when the internal pressure ($p_2$) of the collecting unit is equal to 20 kPa.

As a comparative example, the slope of the normalized response function $R_0(d_p)$ may be e.g. substantially equal to 17%/100 nm in the size range (RNG2) of 100 nm to 200 nm, when the internal pressure of the collecting unit is equal to 100 kPa.

Referring to FIG. 2*f*, the penetration function $\eta_{MOD1}(d_p)$ of the modifying unit MOD1 may have an effect on the total detection efficiency $\eta_{tot}(d_p)$, and on the response function $R_0(d_p)$. For example, the penetration function $\eta_{MOD1}(d_p)$ of the modifying unit MOD1 may be selected to provide a substantially flat response in the vicinity of the upper limit of a detection size range RNG0 of the measuring apparatus 500. For example, the cut-off size $d_{cut}$ of the penetration function $\eta_{MOD1}(d_p)$ may be selected so as to provide a substantially flat response in the vicinity of the upper limit of a detection size range RNG0 of the measuring apparatus 500.

Referring to FIG. 3, the apparatus 500 may comprise e.g. a critical orifice OR1 for providing a reduced internal pressure ($p_2$) for the collecting unit 200. The pressure reducing unit PDU1 may comprise a critical orifice OR1. The critical orifice OR1 may be located e.g. in a sampling line 50 of the apparatus 500.

The charging unit 100 may be arranged to generate ions J1 e.g. by a corona discharge DSR1. The charging unit 100 may comprise a corona electrode E1 for forming the corona discharge DSR1. The corona electrode E1 may be arranged to form the corona discharge DSR1 with a counter-electrode E2. In an embodiment, a conductive housing 150 of the charging unit 100 may operate as the counter-electrode E2.

The corona electrode E1 may be e.g. a conductor which has a sharp tip. The corona electrode E1 may be e.g. an exposed conductor wire which has a narrow diameter. The electrode E1 may be connected to a terminal T1 of the voltage supply VSU1 e.g. via a connector CON1. The corona electrode may be mechanically supported e.g. by one or more insulators (ISO1).

The corona electrode E1 may be arranged to produce ions J1 by corona discharge DSR1. The corona electrode E1 may operate together with a counter-electrode E2. The electrodes E1,E2 may be connected to the high voltage supply VSU1 such that the electrodes E1,E2 have a voltage difference V1. The corona electrode E1 and the counter-electrode E2 may together form an electric field, which generates the corona discharge DSR1 in the vicinity of the corona electrode E1. The strength of the electric field may locally exceed the dielectric strength of the gas so that the corona discharge DSR1 may be formed in the vicinity of the corona electrode E1.

The generated ions J1 may move with respect to the particles P0 by diffusion. Some diffusing ions J1 may collide with particles P0 so as to transfer charge to the particles. The charging unit may form charged particles by diffusion charging. The transfer of charge from the ions J1 to the particles may take place in a charging space (SPC1) of the charging unit 100.

The output aerosol sample flow FG2 of the charging unit 200 may comprise electrically neutral particles, charged aerosol particles P1, and ions J1. The particles P0, P1 and the ions J1 of the flow FG2 may be suspended in a gas.

The output aerosol sample flow FG2 of the charging unit 200 may be guided via an ion trap TRAP1 so as to remove the ions J1.

The ion trap TRAP1 may be positioned downstream of the charging unit 100 and upstream of the collecting unit 200. The ion trap TRAP1 may remove at least a part of the ions J1 from the aerosol flow FG2, FG3, which is guided to the collecting unit 200. Using the ion trap TRAP1 may stabilize the electric current $I_1(t)$. The ion trap TRAP1 may comprise e.g. two or more deflecting electrodes E5, E6 to provide an electric field, which may deflect ions J1 away from the flow FG3. The electric field may be substantially transverse with respect to the direction of the gas flow FG3 passing through the electrodes E5, E6. The ion trap TRAP1 may comprise electrodes E5, E6. The ion trap may comprise e.g. a pair of substantially parallel electrodes E5, E6. The electrodes E5, E6 may be connected to a voltage difference V5 in order to generate the electric field. The magnitude of the electric field and/or the velocity of the gas flow passing through the space the electrodes E5, E6 may be selected such that a (first) suitable fraction of the charged particles P1 may pass through the ion trap TRAP1 and such that a (second) suitable fraction of the ions J1 may be deflected away from the flow FG3. Thus, a large part of the charged particles P1 may pass through the ion trap TRAP1 to the detector DET1. The lower cut-off size of particles which may pass through the ion trap may be selected by selecting the voltage difference V5. The voltage V5 of the ion trap TRAP1 may be optionally used as an additional parameter for adjusting the shape of the total detection efficiency curve $\eta_{tot}(d_p)$.

The ion trap TRAP1 may form a substantially ion-free aerosol sample flow FG3 by removing the ions J1. The aerosol sample flow FG3 may comprise neutral particles P0 and charged particles P1 suspended in a gas.

The aerosol sample flow FG3 may be guided to the collecting unit 200 for collecting charges from the particles P1. The collecting unit 200 may comprise one or more collecting elements E3 for collecting charges by diffusion. The charged particles P1 may move in the vicinity of a collecting element E3 by diffusion. Some charged particles P1 may contact a collecting element E3, so as to transfer a net amount of charge to the collecting element E3. The collecting elements E3 may be galvanically connected to a conductor CON3 for guiding the collected charges as the current $I_1(t)$ to the current measuring unit CMU1. The collecting elements E3 may be e.g. conductive mesh elements.

The collecting unit 200 may be arranged to collect charges by diffusion of the charged particles P1. The collecting unit 200 may be arranged to operate such that charged particles P1 are not attracted towards the collecting elements E3 by an electric field. The electric field in the vicinity of the charge-collecting portions of the collecting elements E3 may be substantially equal to zero.

The collecting unit 200 may optionally comprise one or more electrically insulating seals ISO3a, ISO3b to confine the aerosol flow to a region where the electric field is substantially equal to zero.

The collecting unit 200 may be arranged to operate such that the collecting efficiency function may have a negative slope at least in the particle size range of 100 nm to 200 nm. The collecting elements E3 may be arranged to collect charge from the particles such that a large part of the particles may pass through the collecting unit 200. The mesh size of the collecting elements E3 may be selected such that at least 80% of particles having a mobility size of 200 nm may pass through the collecting unit 200.

The apparatus 500 may comprise a conductive shield E4. The shield E4 may surround the collecting elements E3, so as to protect the collecting elements E3 from electrostatic interference. The shield E4 may surround the collecting elements E3 e.g. as a Faraday cage.

The current monitoring unit CMU1 may receive the detector current $I_1(t)$ from the collecting elements E3 via a conductor CON3. The conductor CON3 may be connected to an input terminal (IN3) of the current monitoring unit CMU1. The apparatus 500 may optionally comprise an electric feedthrough for guiding the detector current $I_1(t)$ from the collecting elements E3 to the current monitoring unit CMU1. The electric feedthrough may comprise a portion of the conductor CON3 surrounded by an electric insulator ISO3.

A reference terminal (IN4) of the current monitoring unit CMU1 may be directly or indirectly connected to electrical ground GND1 of the apparatus 500. The shield E4 may also be directly or indirectly connected to a fixed potential, e.g. to the electrical ground GND1 of the apparatus 500.

The suction unit VAC1 may comprise an ejector or a pump PUMP1 for drawing a flow FG4 from the collecting unit 200. The suction unit VAC1 may optionally comprise an adjustable valve VAL1 for controlling a flow rate ($Q_1$) via the suction unit VAC1. The suction unit VAC1 may comprise a pressure sensor PSEN1 for monitoring internal pressure ($p_2$) of the collecting unit 200. The suction unit VAC1 may comprise a control unit CNT2 for adjusting flow rate of the suction unit VAC1, so as to keep the internal pressure ($p_2$) of the collecting unit 200 substantially equal to a selected pressure value ($p_{SET}$). The flow rate of the suction unit VAC1 may be adjusted e.g. by adjusting the valve VAL1 and/or by controlling operation of the pump PUMP1. The control unit CNT2 may provide a control signal for controlling operation the valve VAL1 and/or for controlling operation of the pump based on a signal of the pressure sensor PSEN1. The pump PUMP1 may be e.g. a diaphragm pump, a piston pump, a rotary vane pump, or a peristaltic pump. The pump PUMP1 may be positioned downstream of the collecting unit 200 so that the pump PUMP1 does not remove particles from the flow FG3 before the particles P1 are detected by the collecting unit 200.

The apparatus 500 may comprise a control unit CNT1 for processing measured data and/or for controlling operation of the apparatus 500. The control unit CNT1 may comprise one or more signal processors for processing data. The control unit CNT1 may e.g. determine number density values $n_0(t)$ from a detector signal $S_1(t)$ obtained from the current monitoring unit CMU1. The apparatus may comprise a memory MEM1 for storing calibration data CAL1. The apparatus may be configured to determine a number density value $N_0(t)$ from a measured detector current $I_1(t)$ by using a proportionality constant stored as calibration data CAL1 in the memory MEM1. The apparatus may comprise a memory MEM2 for storing computer program code PROG1. The apparatus may be arranged to determine one or more measured values by executing the program code PROG1. The computer program PROG1 may comprise computer program code configured to, when executed on at least one data processor, cause the control unit CNT1 to control operation of the apparatus 500. The computer program PROG1 may comprise computer program code configured to, when executed on at least one data processor, cause processing of measured data (e.g. the signals $I_1(t)$, $S_1(t)$). The apparatus may comprise a memory MEM3 for storing measured detector current values $I_1(t)$ and/or for storing determined number density value $n_0(t)$. The apparatus 500 may optionally comprise a communication unit RXTX1 for receiving and/or transmitting data. The apparatus may optionally comprise a communication unit RXTX1 for communicating measured and/or determined values to an external device, e.g. to a server. The communication unit RXTX1 may transmit e.g. the signal $S_1(t)$ e.g. to an external portable computer. The communication unit RXTX1 may transmit e.g. the signal $S_1(t)$ e.g. to an Internet server. The communication unit RXTX1 may receive and/or transmit data e.g. by using wireless transmission, by using an optical cable and/or by using an electric cable.

The apparatus may optionally comprise a user interface UIF1 for receiving user input and/or for providing information to a user. The user interface UIF1 may comprise e.g. a display, a touchscreen and/or a keyboard.

Figure 4A:
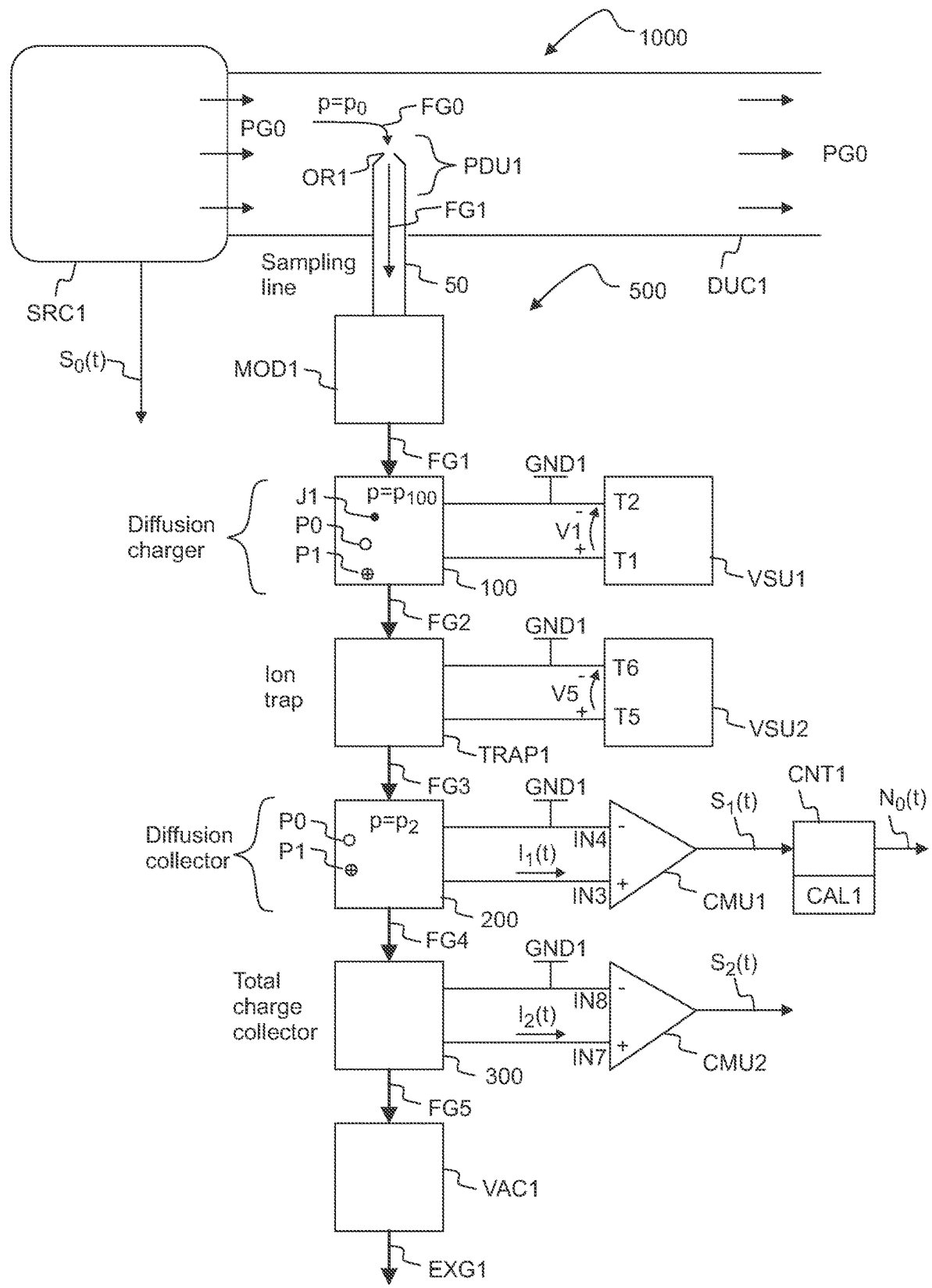
FIG. 4a shows, by way of example, an apparatus for measuring number density of aerosol particles, the apparatus further comprising an auxiliary detector unit for detecting total charge of particles.
Figure 4B:
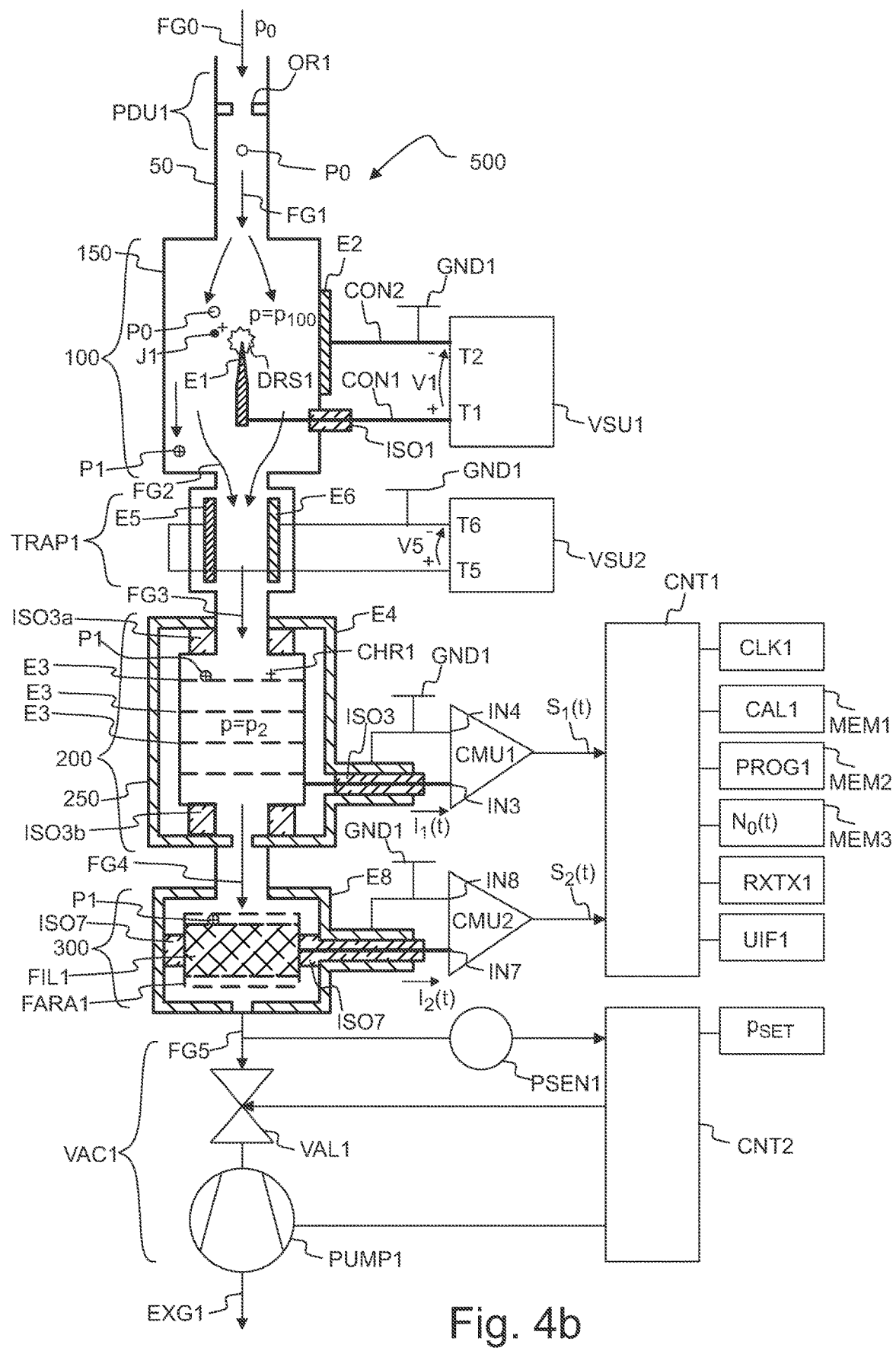
FIG. 4b shows, by way of example, an apparatus for measuring number density of aerosol particles.

The apparatus 500 may optionally comprise a user interface UIF1 for providing information to a user and/or for receiving user input from a user. The user interface UIF1 may comprise e.g. a display and one or more keys. The user interface UIF1 may comprise e.g. a touch screen. The user interface UIF1 may be arranged to display e.g. the magnitude of the electric current $I_1(t)$, the measured number density $n_0(t)$, and/or the magnitude of the auxiliary electric current $I_2(t)$ (FIG. 4a).

The units 50, PDU1, 100, TRAP1, 200, 300 may be positioned e.g. in a cabinet, close to a running engine and/or close to a dilution system. The interface UIF1 may also be remote from the units so that the interface UIF1 may be located at an ergonomic and/or safe position. A portable computer or a mobile device (e.g. a smartphone) may be arranged to communicate with the apparatus 500 via the communication unit RXTX1, and said portable computer or mobile device may be arranged to operate as the interface UIF1.

Data measured by the device 200 may also be processed in a distributed manner. For example, conversion of the signal $S_1$ into number density values $n_0(t)$ may be performed in a separate data processor. The data may be processed e.g. by a portable computer and/or by using an internet server.

The apparatus 500 may optionally comprise a clock CLK1 to provide time information. For example, the signal $S_1(t)$ and/or the measured number density $n_0(t)$ may be recorded in the memory MEM3 such that the recorded data is associated with the time information. The recorded data may be time-stamped.

In an embodiment, the dilution gas flow DG0 may also be guided to the charging unit 100 to protect the corona electrode E1 of the charging unit 100 from the particles of the aerosol sample flow. The protective dilution gas flow DG0 may be arranged to keep the corona electrode E1 clean. Guiding the sample aerosol flow via a first critical orifice OR1 to a reduced pressure ($p_{100}$, $p_2$) of the charging unit 100, and guiding a protecting gas flow DG0 to the charging unit 100 via a second critical orifice OR2 may protect the corona electrode E1, and may provide a diluted sample aerosol flow at a substantially constant dilution ratio. The charging unit 100 may be arranged to guide the dilution gas flow DG0 towards the corona electrode E1 to form a substantially particle-free region, which surrounds the corona electrode E1. The dilution gas flow DG0 may be arranged to flush the coronal electrode E1.

The input aerosol FG0 or the sample flow FG1 may have an initial particle size distribution. The apparatus 500 may comprise a modifying unit MOD1 e.g. to dilute the sample and/or to remove large particles from the aerosol sample flow. The modifying unit MOD1 may modify the particle size distribution of the aerosol sample flow.

The apparatus 500 may comprise a modifying unit MOD1 e.g. to dilute the sample and/or to remove particles larger than a predetermined cut-off size from the aerosol sample flow. The modifying unit MOD1 may comprise e.g. a diluting unit DIL1 to dilute the aerosol sample flow and/or a particle filter to remove large particles from the aerosol sample flow. The cut-off size may be e.g. in the range of 1 μm to 10 μm. The cut-off size may be selected to provide a substantially linear shape of the total detection efficiency $\eta_{tot}(d_p)$ e.g. in the size range of 40 nm to 1000 nm. The cut-off size dour may be selected to avoid significantly deforming the substantially linear shape of the combined detection efficiency $\eta_{CMB}(d_p)$ in the size range of 40 nm to 200 nm. The cut-off size dour may be e.g. in the range of 0.5 μm to 5 μm. The cut-off size may be e.g. in the range of 1 μm to 2 μm. The sample modifying unit may be positioned e.g. before the charging unit 100. The sample modifying unit may be positioned after the pressure reducing unit PDU1 such that also the sample modifying unit may have reduced internal pressure. The sample modifying unit may comprise e.g. a filter, a cyclone, and/or an impactor. The reduced internal pressure may facilitate operation of the filter, cyclone, and/or impactor.

Referring to FIGS. 4*a* and 4*b*, the apparatus 500 may optionally comprise an auxiliary detector unit 300 to detect charge of particles P1, which leave the first collecting unit 200. The auxiliary detector unit 300 may detect total charge carried by the aerosol flow FG4. The auxiliary detector unit 300 may be arranged to detect e.g. at least 50% of the charged particles leaving the collector unit 200. The auxiliary detector unit 300 may provide an electric current $I_2(t)$, which is proportional to the charge of the particles captured by the auxiliary detector unit 300 per unit time.

The method may comprise measuring a second auxiliary current $I_2(t)$, which is indicative of charges of aerosol particles which leave the collecting unit 100. The first detector current $I_1(t)$ of the collecting unit 100 may be indicative of e.g. number concentration of the particles of the input flow, and the second auxiliary current $I_2(t)$ may be indicative of e.g. surface area concentration of the aerosol particles. The first current $I_1(t)$ may be substantially independent of particle size e.g. in the size range of 40 nm to 200 nm, whereas the second current $I_2(t)$ may depend on the particle size in the size range of 40 nm to 200 nm. The different behavior of the currents $I_1(t)$, $I_2(t)$ may allow estimating an average particle size ($d_{P,ave}$) from these two signals $I_1(t)$, $I_2(t)$. The method may comprise determining an average particle size ($d_{P,ave}$) from the first detector current $I_1(t)$ and from the second auxiliary current $I_2(t)$.

The method may comprise using the auxiliary detector unit 300 to provide an auxiliary electric current ($I_2(t)$) indicative of charge of charged particles (P1) which pass the collecting unit 200.

The method may comprise determining an average particle size ($d_{P,ave}$) from the electric current ($I_1(t)$) of the collecting unit 200 and from the auxiliary electric current ($I_2(t)$) of the auxiliary detector unit 300.

The second auxiliary current $I_2(t)$ may be used for checking reliability of a measured number density $n_0(t)$ and/or for checking whether the measuring apparatus operates properly or not. A constant second auxiliary current $I_2(t)$ may be an indication that the measurement result is valid and/or that the measuring apparatus 500 is operating properly, in a situation where the particle size distribution of the input flow FG0 is known to remain unchanged. A change of the second auxiliary current $I_2(t)$ may be an indication that the measurement is not valid and/or that the measuring apparatus 500 is not operating properly, in a situation where the particle size distribution of the input flow FG0 is known to remain unchanged.

The auxiliary detector unit 300 may collect the particles P1 of the flow FG4. The auxiliary detector unit 300 may comprise e.g. a particle filter FIL1 for capturing the particles. The filter FIL1 may be called e.g. as a monitoring filter. The filter FIL1 may be electrically conductive or electrically insulating. The filter FIL1 may be surrounded by a Faraday cage FARA1, or an electrically conductive outer layer of the filter FIL1 may operate as the Faraday cage FARA1. The filter FIL1 and/or the Faraday cage FARA1 may be supported by one or more insulators ISO7. An electrically conductive filter FIL1 may comprise e.g. sintered conductive particles or conductive fibers. The Faraday cage FARA1 and/or the conductive filter FIL1 may be galvanically connected to a second current monitoring unit CMU2. The current monitoring unit CMU2 may provide a second current signal $S_2(t)$ by measuring the second auxiliary current $I_2(t)$. The second current signal $S_2(t)$ by be indicative of the magnitude of the second auxiliary current $I_2(t)$. The signal $S_2(t)$ may be e.g. a digital signal. The current monitoring unit CMU2 may comprise e.g. an electrometer for measuring the second auxiliary current $I_2(t)$.

The charge carried by charged particles P1 may be detected by using the Faraday cage FARA1 and the current monitoring unit CMU2 also in a situation where the charged particles P1 captured by the filter DFIL inside the Faraday cage FARA1 do not touch the Faraday cage FARA1.

The filter FIL1 may be selected such that e.g. more than 90% of particles having a size of 200 nm may be collected by the filter FIL1. The filter FIL1 may collect aerosol particles e.g. by interception, inertial impaction, diffusion, gravitational settling and/or electrostatic collection. The filter FIL1 may collect particles irreversibly such that the particles are not released from the detector FIL1 back into the gas flow. The detector FIL1 may collect particles during the measurement period such that e.g. less than 10% of the mass of the collected particles is released from the detector FIL1 back into to gas flow FG5 during the measurement period. The suction unit VAC1 may cause the aerosol flow (F0, FG1, F2, FG3, FG4) by drawing the gas flow FG5 from the auxiliary detector unit 300.

Figure 5:
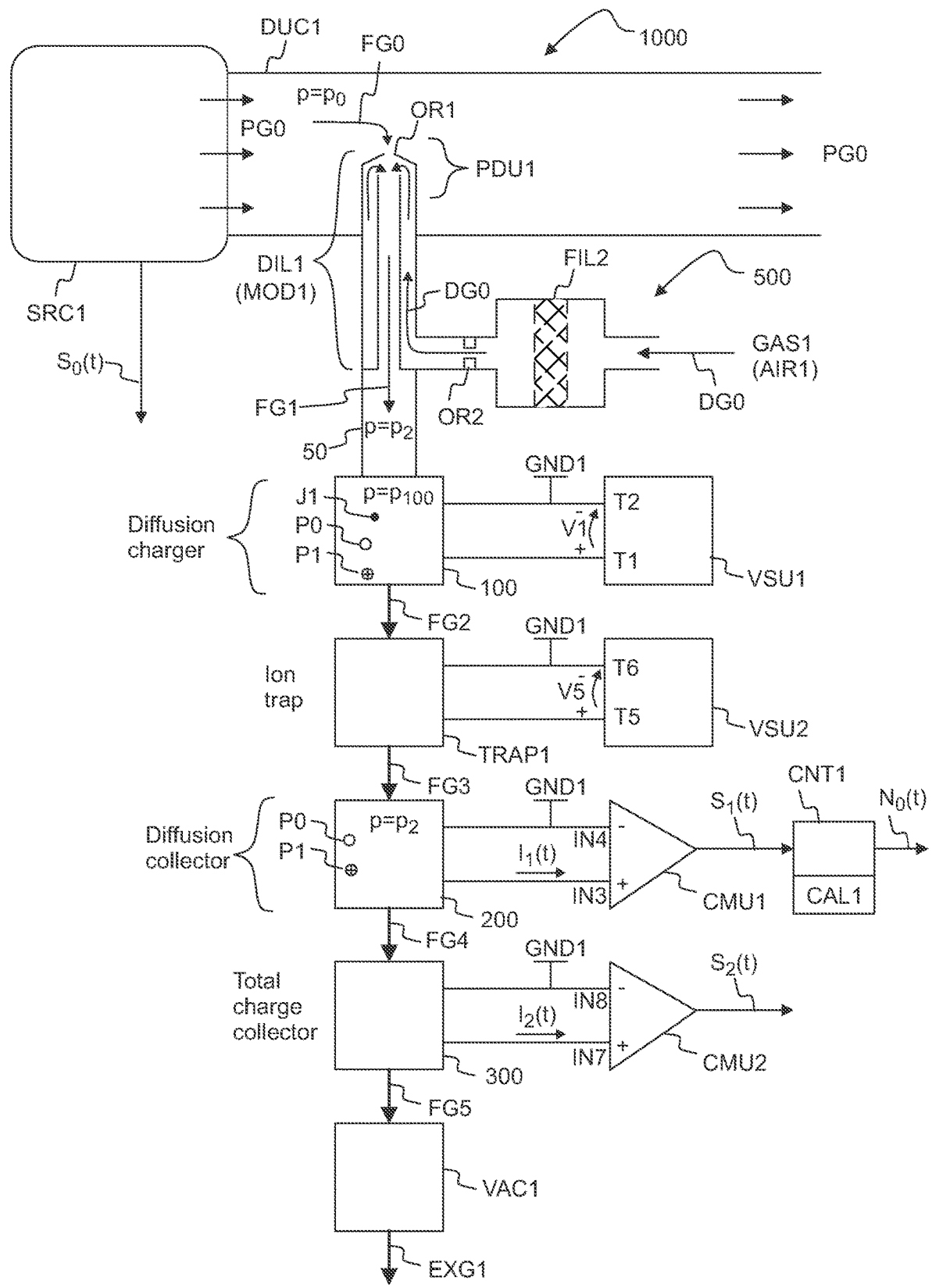
FIG. 5 shows, by way of example, an apparatus for measuring number density of aerosol particles, the apparatus further comprising a diluting unit for providing a diluted sample flow.

Referring to FIG. 5, the apparatus 500 may comprise a diluting unit DIL1 to dilute the aerosol sample flow e.g. at a constant dilution ratio. The diluting unit DIL1 may comprise e.g. a second critical orifice OR2 for guiding a diluting gas flow DG0 to the sampling line 50. The gas GAS1 of the diluting gas DG0 may be substantially particle-free gas. The diluting gas GAS1 may be obtained e.g. from a gas cylinder. The diluting gas GAS1 may be e.g. ambient air AIR1. The diluting unit DIL1 may optionally comprise e.g. a filter FIL2 to remove particles from the diluting gas GAS1.

The aerosol sample flow (FG0, FG1) may be guided via a first critical orifice OR1 to the reduced pressure $p_2$, and the diluting gas flow DG0 may be guided via a second critical orifice OR2 to the same reduced pressure $p_2$. The aerosol sample flow (FG0, FG1) may be combined with the diluting gas flow DG0 e.g. in the sampling line 50 or in the charging unit 100, so as to provide a diluted sample. The pressure ratio $p_2/p_0$ may be e.g. smaller than 0.5, so as to ensure choked (critical) flow through the orifices OR1, OR2. This may provide a diluted aerosol sample flow at a constant dilution ratio.

In an embodiment, a diluting gas flow (DG0) may also be guided via a critical orifice (OR2) to the charging unit 100, e.g. in order to protect the corona electrode E1 from contaminating particles.

Figure 6A:
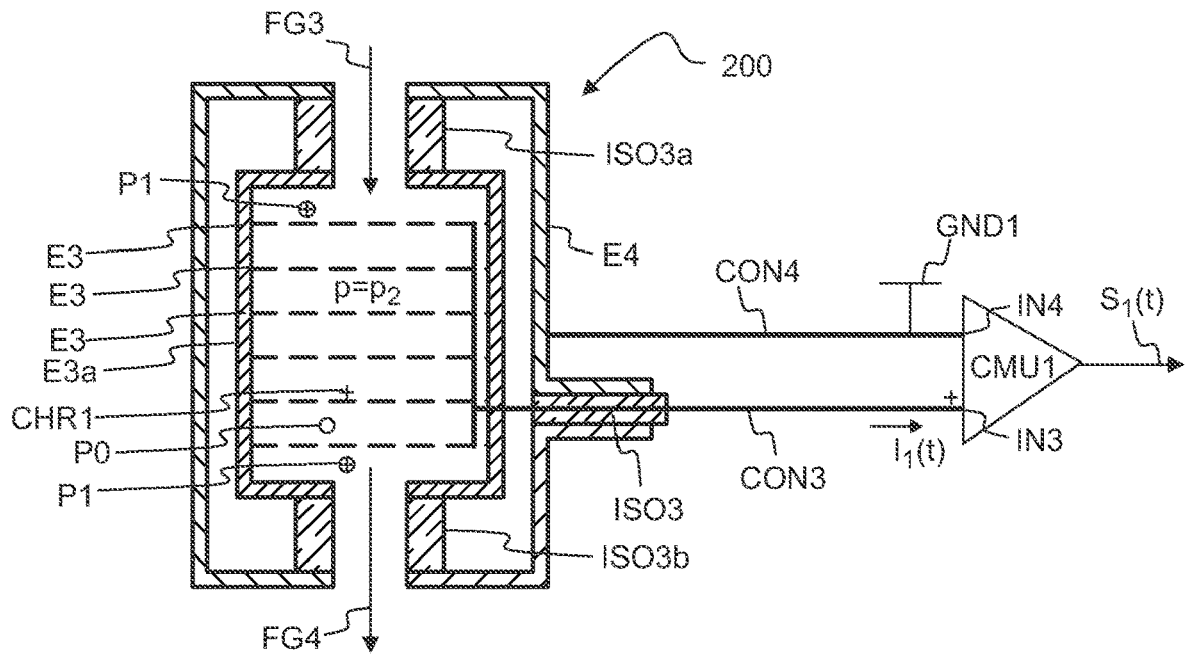
FIG. 6a shows, by way of example, a collecting unit for collecting charges from charged particles by diffusion.

Referring to FIG. 6a, the collecting elements E3 of the collecting unit 200 may be e.g. conductive mesh elements. Charges (CHR1) collected by the collecting elements E3 may be conducted to the current monitoring unit CMU1 via a conductor CON3. The conductive mesh elements may be surrounded by a conductive housing E3a. The elements E3 and/or the housing E3a may be supported by one or more insulators ISO3a, ISO3b. The collected charges (CHR1) may be conducted as the current $I_1(t)$ via a conductor CON3 to an input terminal T3 of the current monitoring unit CMU1.

The collecting unit 200 may be arranged to operate based on diffusion collecting. The collecting unit 200 may be arranged to operate such that a major part of the aerosol particles may pass through the collecting unit 200. The collecting unit 200 may be arranged to operate such that less than 20% of particles of size 200 nm are captured by the collecting elements E3. For example, the mesh size of the elements E3 may be selected such that less than 20% of particles of size 200 nm are captured by the collecting elements E3.

The collecting unit 200 may comprise a conductive shield E4. The conductive shield E4 may operate as a Faraday cage to protect the elements E3 and/or the housing E3a from electrostatic interference. The shield E4 may be connected to an input terminal IN4 of the current monitoring unit CMU1 and/or to the electric ground GND1 of the apparatus 500.

The elements E3 and/or the housing E3a may be arranged to operate such that electric field in the vicinity of the elements E3 may be small or zero, so as to reduce or avoid collecting of particles by electrostatic forces.

The dimensions of the elements E3 and/or gaps between the elements E3 may be selected such that the collecting unit 200 may collect charges (CHR1) mainly by diffusion. The dimensions of the elements E3 and/or gaps between the elements E3 may be selected to reduce or minimize collecting by interception, by inertial impaction and/or by electrostatic attraction.

Figure 6B:
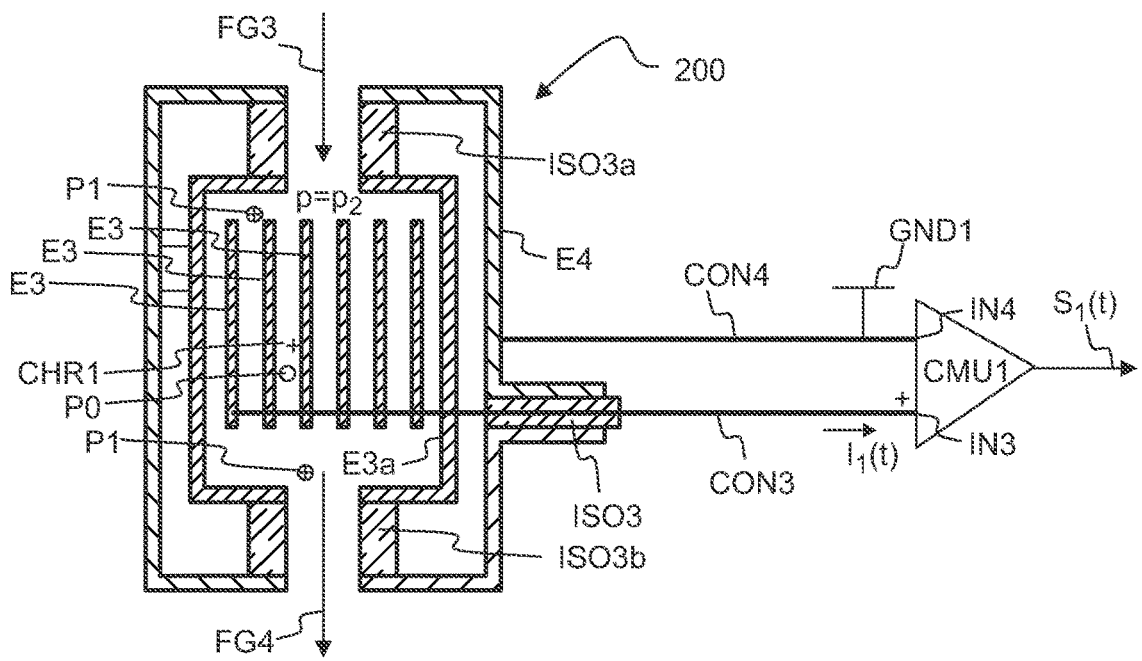
FIG. 6b shows, by way of example, a collecting unit for collecting charges from charged particles by diffusion.

Referring to FIG. 6b, the collecting elements E3 of the collecting unit 200 may also be e.g. plate elements.

Figure 7A:
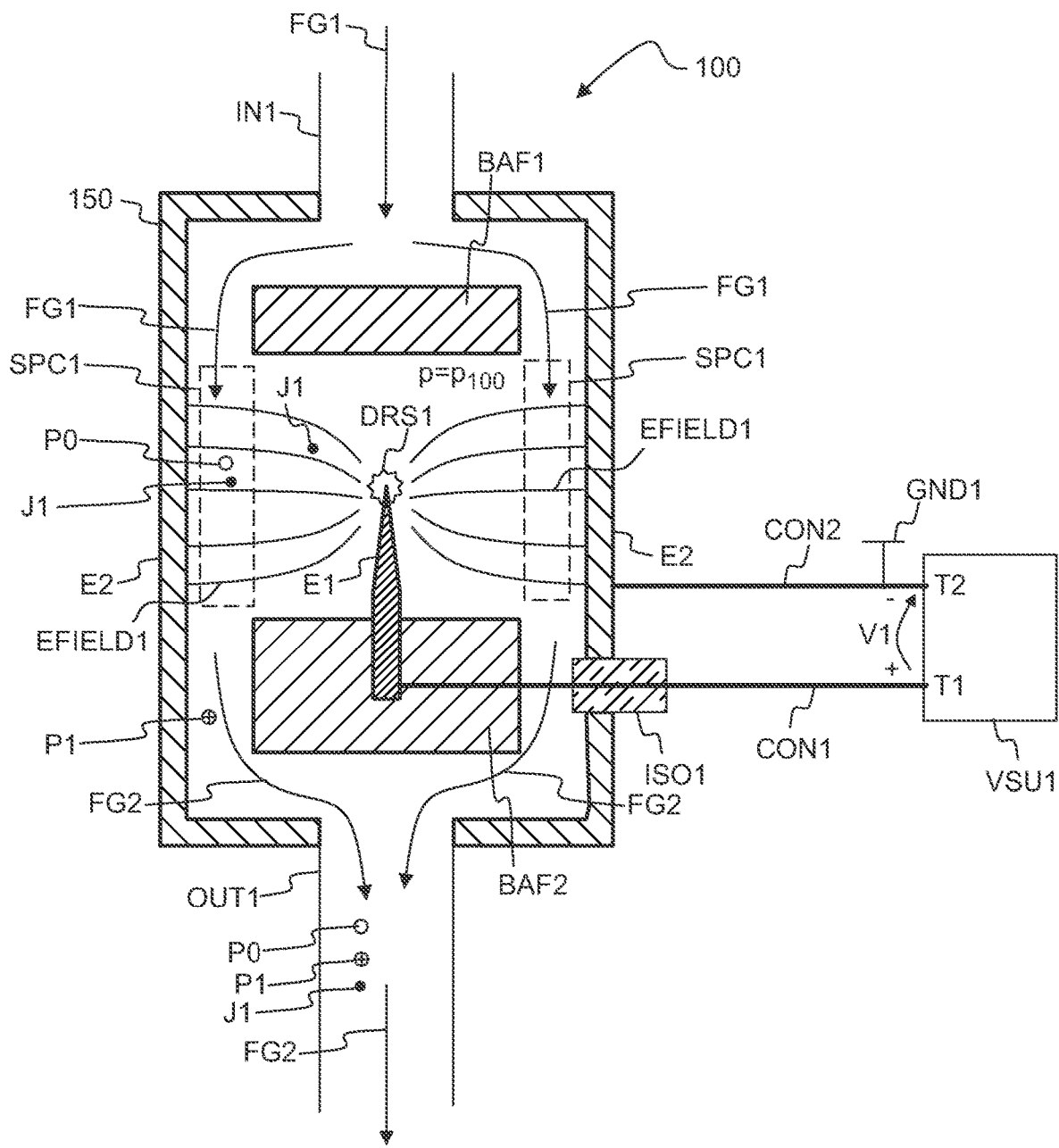
FIG. 7a shows, by way of example, a charging unit for charging particles by diffusion charging.
Figure 7B:
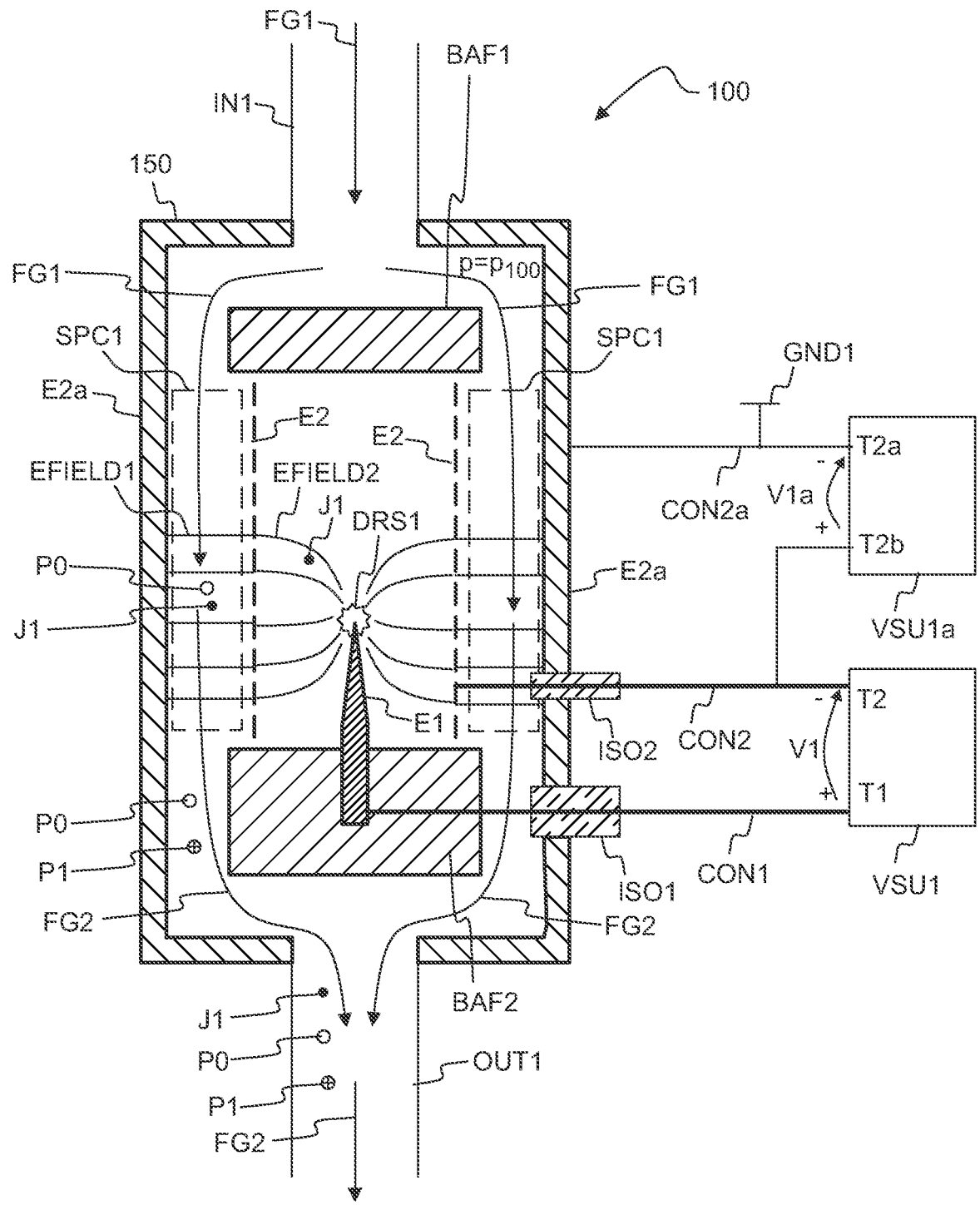
FIG. 7b shows, by way of example, a charging unit for charging particles by diffusion charging.

Referring to FIG. 7a, the charging unit 100 may comprise one or more flow guides BAF1, BAF2 to increase a distance between the aerosol flow and the corona discharge DSR1. Increasing the distance may shift the aerosol flow to a region (SPC1) where an electric field EFIELD1 generated by the corona electrode E1 and the counter-electrode E2 is weak. For example, the aerosol sample flow may be guided via a charging space (SPC1) such that the maximum strength of the electric field EFIELD1 across the aerosol sample flow (FG1) in the charging space (SPC1) is smaller than 100 V/cm. Reducing the electric field EFIELD1 may increase the relative contribution of diffusion charging. Reducing the electric field EFIELD1 may ensure that particles in the size range of 40 nm to 200 nm are mainly charged by diffusion charging. The flow guides BAF1, BAF2 may guide the aerosol flow away from the corona discharge DSR1. The flow guides BAF1, BAF2 may guide the aerosol flow to a charging region SPC1 which is in the vicinity of the counter electrode E2. The charging region SPC1 may be located between the electrodes E1, E2.

The apparatus 500 may comprise a voltage supply VSU1 to provide operating power for the charging unit 100. The apparatus 500 may comprise a high voltage supply VSU1 to provide a high voltage V1 to a corona electrode E1 of the charging unit 100.

The high corona voltage V1 and the corona current may be conducted from the voltage supply VSU1 to the corona electrode E1 via a conductor CON1. The charging unit 100 may comprise a feedthrough for conducting the corona current through the housing 150 to the corona electrode E1. The feedthrough may comprise a portion of the conductor CON1 and an electric insulator ISO1.

The charging unit (100) for forming a charged particles (P1) from aerosol particles (P0) of a sample flow (FG1) may comprise:

an inlet (IN1) for receiving an aerosol sample flow (FG1), a corona electrode (E1) to generate ions (J1) by forming a corona discharge (DSR1) together with a counter-electrode (E2), a charging space (SPC1) for forming charged particles (P1) from the aerosol particles (P0) of the aerosol sample flow (FG1) by diffusion of the generated ions (J1), and one or more flow guides (BAF1) for guiding the received aerosol sample flow (FG1) via the charging space (SPC1) such that the maximum strength of the electric field (EFIELD1) across the aerosol sample flow (FG1) in the charging space (SPC1) is smaller than 100 V/cm.

The charging unit 100 may comprise an outlet OUT1 for providing an aerosol sample flow (FG1) with the charged particles (P1). The charging unit 100 may provide a charged aerosol sample flow (FG2), which comprises charged particles (P1) and neutral particles (P0).

Implementing the charging unit (100) with the two electrodes (E1, E2) and with the flow guides (BAF1) may allow sufficient accuracy and rugged construction at relatively low costs.

Referring to FIG. 7*b*, the counter-electrode E2 of the charging unit may also be a conductive mesh, which may surround the corona electrode E1. The generated ions J1 may pass through the conductive mesh to a charging zone SPC1 outside the mesh electrode E2. The ions J1 may charge particles by diffusion charging in the charging zone SPC1.

A housing of the charging unit 100 may operate as an auxiliary electrode E2*a*. The auxiliary electrode E2*a* may be connected e.g. to a terminal T2*a* of an auxiliary voltage supply VSU1*a* via a conductor CON2*a*. The counter-electrode E2 may be connected to a terminal T2*b* of the auxiliary voltage supply VSU1*a*.

The corona electrode E1 and the counter electrode E2 may form an inner electric field EFIELD2. The counter electrode E2 and the auxiliary electrode E2*a* may form an outer electric field EFIELD1. The inner electric field EFIELD1 may cause drifting of ions J1 from the discharge region DSR1 towards the counter-electrode E2. The strength of the electric field EFIELD1 across the charging zone SPC1 may be substantially lower than the strength of the inner electric field EFIELD2. The reduced strength of the electric field EFIELD1 across the charging zone SPC1 may increase the relative contribution of diffusion charging.

The apparatus may be arranged to provide an auxiliary voltage V1*a* between the counter-electrode E2 and the auxiliary electrode E2*a*. The auxiliary voltage V1*a* may have an effect on the shape of the charging efficiency curve $\eta_1(d_p)$ of the charging unit 100. The auxiliary voltage V1*a* may be optionally used as an additional operating parameter, which may be selected to adjust shape of the total detection efficiency $\eta_{tot}(d_p)$ of the measuring apparatus 500.

The auxiliary electrode E2*a* may also be (directly) connected to the counter-electrode E2, so as to minimize the electric field EFIELD1 across the charging zone SPC1.

The signal $S_1(t)$, $S_2(t)$ provided by the current monitoring unit CMU1, CMU2 may be optionally compensated e.g. by using a background signal value. The background signal value may be determined experimentally e.g. by measuring the electric current signal $I_1(t)$, $I_2(t)$ e.g. in a situation where the flow rate ($Q_1$) is zero or when substantially particle free gas is guided via the units 100, 200, 300.

The sample flow may be optionally diluted. The dilution ratio may be constant or the dilution ratio may vary e.g. according to the flow rate of the exhaust gas guided to a dilution system. For example, the exhaust gas of an engine may be guided to a tunnel of a Constant Volume Sampler such that the dilution ratio may vary during a particle emission experiment, e.g. according to the output power of the engine.

Referring to FIGS. 8*a* and 8*b*, a measurement set-up 1002 may comprise an aerosol source SRC1 and an aerosol measuring apparatus 502.

The measuring apparatus 502 may comprise a pressure reducing unit PDU1, a low-pressure sampling line 50, an aerosol measuring instrument INSTR1, and a suction unit VAC1 to draw an aerosol sample flow FG1 via the low-pressure sampling line 50 to the aerosol measuring instrument INSTR1.

The measuring instrument INSTR1 may be e.g. the above-described device 500 for measuring the number density of particles. However, the measuring instrument INSTR1 may also be another aerosol measuring device. The measuring instrument INSTR1 may be arranged measure one or more aerosol parameter values of the aerosol sample flow FG1. The measuring instrument INSTR1 may be arranged measure e.g. one or more aerosol parameter values selected from the following list: number density of particles, mass concentration of particles, particle size distribution, average particle size, particle surface area concentration. The measuring instrument INSTR1 may be e.g. an optical particle counter.

The measuring instrument INSTR1 may optionally provide one or more signals $S_{11}(t)$ indicative of one or more measured aerosol parameter values. The measuring instrument INSTR1 may have an inlet IN1 for receiving an aerosol sample flow FG1, and an outlet OUT2 for an outlet flow FG12. The measuring instrument INSTR1 may form the outlet flow FG12 from the aerosol sample flow FG1 by guiding the gas phase of the aerosol sample flow FG1 from the inlet IN1 to the outlet OUT2.

The apparatus (502) may comprise:

a critical orifice (OR1) to reduce pressure ($p_{50}$) of an aerosol sample flow (FG1), an aerosol measuring instrument (INSTR1) to measure one or more aerosol parameter values of the aerosol sample flow (FG1), a sampling line (50) to guide the aerosol sample flow (FG1) from the critical orifice (OR1) to the aerosol measuring instrument (INSTR1), and a suction unit (VAC1) to draw the aerosol sample flow (FG1) from the critical orifice (OR1) to the aerosol measuring instrument (INSTR1) via the sampling line (50), wherein the critical orifice (OR1) and the suction unit (VAC1) are arranged to keep internal pressure ($p_{50}$) of the sampling line (50) lower than 50 kPa.

Guiding the aerosol sample flow FG1 via the sampling line 50 at the reduced pressure ($p_{50}$) may provide one or more of the following effects:

reduced risk of condensation of volatile compounds,
reduced risk of altering the particle size distribution due to condensation,
faster response due to higher velocity of particles in the sampling line.

Referring to FIG. 8b, the measuring apparatus 502 may further comprise a diluting unit DIL1. The diluting unit DIL1 may be arranged to form a diluted sample flow FG1 by combining an input aerosol sample flow FG0 with a dilution gas flow DG0. The diluted aerosol sample flow FG1 may be guided via the low-pressure sampling line 50 to the measuring instrument INSTR1.

Forming the diluted sample flow may also provide one or more of the following effects:
reduced risk of condensation of volatile compounds,
reduced risk of altering the particle size distribution due to condensation,
faster response due to higher velocity of particles in the sampling line.

The measuring apparatus 502 may comprise a pressure reducing unit PDU1 and optionally a diluting unit DIL1. The diluting unit DIL1 may also be arranged to operate as a pressure reducing unit PDU1. The diluting unit DIL1 may comprise one or more orifices OR1 for reducing the pressure ($p_{50}$) of the aerosol sample flow. The diluting unit DIL1 may comprise one or more first critical orifices OR1 for controlling the flow rate of the input flow FG0. The diluting unit DIL1 may comprise one or more second critical orifices OR2 for controlling the flow rate of the dilution gas flow DG0. The diluting unit DIL1 may comprise e.g. a second critical orifice OR2 for guiding a diluting gas flow DG0 to the sampling line 50

The input flow FG0 may be guided to the line 50 via one or more first critical orifices OR1. The dilution gas flow DG0 may be guided to the line 50 via one or more second critical orifices OR2. The internal pressure ($p_{50}$) of the sampling line 50 may be kept e.g. smaller than 50 kPa in order to ensure critical (choked) flow via the orifices OR1, OR2. The input flow FG0 may have a flow rate $Q_{FG0}$, and the dilution gas may have a flow rate $Q_{DG0}$. Keeping the internal pressure ($p_{50}$) of the sampling line 50 at a predetermined value smaller than 50 kPa and guiding the flows (FG0, DG0) via the orifices OR1, OR2 may provide a substantially constant dilution ratio ($Q_{FG0}/Q_{DG0}$).

The aerosol sample flow (FG0, FG1) may be guided via a first critical orifice OR1 to the reduced pressure $p_{50}$, and the diluting gas flow DG0 may be guided via a second critical orifice OR2 to the same reduced pressure $p_{50}$. The aerosol sample flow (FG0, FG1) may be combined with the diluting gas flow DG0 e.g. in the sampling line 50, so as to provide a diluted sample. The pressure ratio $p_{50}/p_0$ may be e.g. smaller than 0.5, so as to ensure choked (critical) flow through the orifices OR1, OR2. This may provide a diluted aerosol sample flow at a constant dilution ratio.

The diluting unit DIL1 may dilute the aerosol sample flow e.g. at a constant dilution ratio ($Q_{FG0}/Q_{DG0}$). The gas GAS1 of the diluting gas DG0 may be substantially particle-free gas. The diluting gas GAS1 may be obtained e.g. from a gas cylinder. The diluting gas GAS1 may be e.g. ambient air AIR1. The diluting unit DIL1 may optionally comprise e.g. a filter FIL2 to remove particles from the diluting gas GAS1.

The apparatus (502) may comprise:
a dilution unit (DIU), which comprises a first critical orifice (OR1) for reducing pressure of an input aerosol flow (FG0), and a second critical orifice (OR2) for reducing pressure of a dilution gas flow (DG0), wherein the dilution unit (DIL1) is arranged to form a diluted aerosol sample flow (FG1) by combining the input aerosol sample flow (FG0) with the dilution gas flow (DG0) at a reduced pressure (p5o),
an aerosol measuring instrument (INSTR1) to measure one or more aerosol parameter values of the aerosol sample flow (FG1),
a sampling line (50) to guide the aerosol sample flow (FG1) from the dilution unit (DIL1) to the aerosol measuring instrument (INSTR1), and
a suction unit (VAC1) to draw the aerosol sample flow (FG1) from the dilution unit (DIU) to the aerosol measuring instrument (INSTR1) via the sampling line (50), wherein the critical orifices (OR1,OR2) and the suction unit (VAC1) are arranged to keep internal pressure ($p_{50}$) of the sampling line (50) at a selected value $p_{SET}$, which is lower than 50 kPa.

The suction unit VAC1 may comprise e.g. a pump PUMP1 or an ejector to draw the aerosol sample flow FG1 via the sampling line 50 to the measuring instrument INSTR1. The suction unit VAC1 may cause the aerosol sample flow FG1 by drawing a flow FG12 from the measuring instrument INSTR1.

A lower limit of the internal pressure $p_{50}$ of the sampling line may be e.g. 2 kPa (20 mbar). The apparatus 500, 502 may be arranged to operate such that the internal pressure $p_{50}$ of the sampling line is greater than or equal to 2 kPa. The internal pressure $p_{50}$ may be e.g. in the range of 2 kPa to 50 kPa.

The suction unit VAC1 may optionally comprise a pressure sensor PSEN1 for directly or indirectly monitoring the internal pressure ($p_{50}$) of the sampling line 50. The suction unit VAC1 may optionally comprise a valve VAL1 for controlling the flow rate and/or pressure ($p_{50}$) of the flow FG12.

The suction unit VAC1 may optionally comprise a control unit CNT2 for controlling operation of the pump PUMP1 and/or the valve VAL1 based on a signal $S_P$ obtained from the pressure sensor PSEN1. The control unit CNT2 may be arranged to control operation of the pump PUMP1 and/or the valve VAL1 based on a signal $S_P$ obtained from the pressure sensor PSEN1, so as to keep the internal pressure ($p_{50}$) at a predetermined value ($p_{SET}$).

The pressure sensor PSEN1 may provide a signal $S_P$ indicative of the internal pressure ($p_2$) of the collecting unit 200. The pressure sensor PSEN1 may provide a signal $S_P$ indicative of the internal pressure ($p_{50}$) of the sampling line 50. The valve VAL1 may be controlled by providing a control signal $S_{VAL}$ and/or the pump may be controlled by providing a control signal $S_{PUMP}$.

The apparatus 500, 502 may optionally comprise a flow sensor QSEN1 to directly or indirectly monitor flow rate ($Q_1$) of the aerosol sample flow (FG0, FG1). The flow sensor QSEN1 may provide a signal $S_Q$ indicative of the flow rate $Q_1$ of the aerosol sample flow FG1. For example, the apparatus 500, 502 may be arranged to provide an alarm in an instance where the signal $S_Q$ indicates that the flow rate $Q_1$ is not in a predetermined range.

A flow FG12 obtained from the outlet OUT2 of the measuring instrument INSTR1 may comprise particles and/or volatile compounds, or the flow FG1 may be substantially free from contaminants. The suction unit VAC1 may optionally comprise protective filter FIL12 to remove particles and/or volatile gases from the flow FG12. The filter FIL12 may protect the pressure sensor PSEN1, the valve VAL1 and/or the pump PUMP1 from contamination.

The vacuum unit VAC1 may provide an exhaust flow EXG1. After the flow FG12 has been drawn through suction unit VAC1, the exhaust flow EXG1 may be discharged from an outlet e.g. into the ambient air outside the apparatus 500, or into a ventilation duct.

The length $L_{50}$ of a low-pressure zone of the sampling line 50 may be e.g. in the range of 0.5 m to 10 m. The apparatus 502 may be used e.g. for measuring aerosols emitted from an internal combustion engine of a vehicle. An inlet (IN0) of a sampling probe (50a) may be inserted to an exhaust pipe (DUC1) of the vehicle in order to extract the inlet flow FG0.

An aerosol sample flow (FG0) may also be obtained by positioning the inlet (IN0) of the sampling probe (50a) into a primary aerosol (PG0) emitted from an exhaust pipe (DUC1).

The sampling line 50 may be used for guiding an aerosol sample flow FG1 from the sampling probe (50a) to the measuring instrument INSTR1. The measuring instrument INSTR1 may be positioned e.g. in a stationary cabinet or on a movable rack. The distance between the inlet of the sampling probe and the measuring instrument INSTR1 may be e.g. in the range of the range of 0.5 m to 10 m.

Figure 8C:
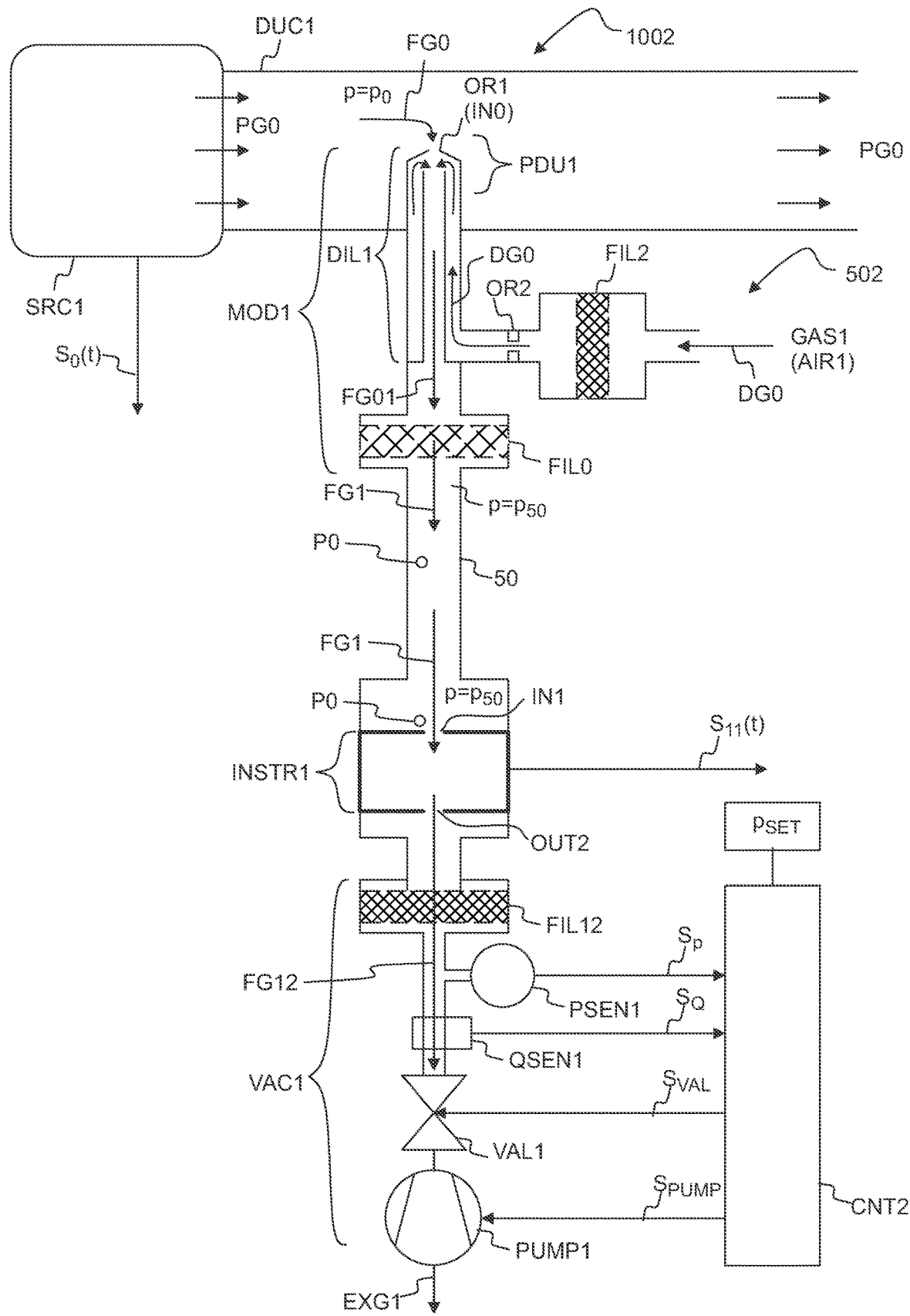
FIG. 8c shows, by way of example, an apparatus for measuring aerosol particles, the apparatus comprising a diluter, a low-pressure sampling line, and a modifier unit.

Referring to FIG. 8c, the apparatus 502 may further comprise a modifier unit MOD1 to modify size distribution of the aerosol sample flow. The modifier unit MOD1 may receive a first aerosol sample flow FG01 e.g. from a diluting unit DIL1 or from a sampling probe. The modifier unit MOD1 may form an aerosol sample flow FG1 by removing particles from a first aerosol sample flow FG01. The modifier unit MOD1 may be arranged to provide a flat response for the measuring instrument INSTR1 e.g. in the particle size range of 400 nm to 1000 nm. The penetration function $\eta_{MOD1}(d_p)$ of the modifier unit MOD1 may be selected to provide a flat response for the measuring instrument INSTR1 e.g. in the particle size range of 400 nm to 1000 nm. The modifier unit MOD1 may comprise e.g. a filter (FIL0), a cyclone and/or an impactor to remove large particles from the aerosol sample flow. The filter (FIL0), a cyclone and/or an impactor may be arranged to modify size distribution of the aerosol sample flow by removing less than 100% of particles in a predetermined size range, so as to provide a substantially flat response ($R_1(d_p)$) for the measuring instrument INSTR1.

The modifier unit MOD1 may also be omitted e.g. in a situation where the aerosol sample flow does not comprise particles larger than the cut-off size $d_{CUT}$.

The pressure reducing unit PDU1 may also be implemented e.g. by one or more orifices OR1. The pressure reducing unit PDU1 may also be implemented e.g. by a filter element, which causes flow resistance. For example, a filter (FIL0) may be arranged to reduce pressure of an aerosol sample flow. For example, a filter (FIL0) may be arranged to operate as a pressure reducing unit PDU1 and/or as a modifier unit MOD1.

The pressure control unit CNT2 may be arranged to control the valve VAL1 and/or the pump PUMP1 in order to keep the internal pressure ($p_2$, $p_{50}$) substantially equal to the selected value $p_{SET}$. The pressure control unit CNT2 may be e.g. electronic and/or mechanical. An electronic pressure control unit CNT2 may comprise e.g. a memory for storing the predetermined pressure value $p_{SET}$. A mechanical pressure regulator CNT2 may be arranged to control the valve VAL1 based on a pressure measured by the sensor PSEN1, so as to keep the internal pressure ($p_2$, $p_{50}$) substantially equal to the selected value $p_{SET}$.

For the person skilled in the art, it will be clear that modifications and variations of the systems, apparatuses, devices and methods according to the present invention are perceivable. The figures are schematic. The particular embodiments described above with reference to the accompanying drawings are illustrative only and not meant to limit the scope of the invention, which is defined by the appended claims.

The invention claimed is:

1. An apparatus for measuring aerosol particles, the apparatus comprising:
a charging unit configured to form charged particles by charging particles of an aerosol sample flow by diffusion charging,
a collecting unit configured to provide an electric current by collecting charges from the charged particles by diffusion of the charged particles, the electric current being indicative of a number density of aerosol particles of the aerosol sample flow,
a pressure reducing unit configured to reduce pressure of the aerosol sample flow, and
a suction unit configured to draw the aerosol sample flow via the charging unit to the collecting unit, wherein a charging efficiency function is indicative of an efficiency of the diffusion charging to charge the particles as a function of particle size,
wherein a collecting efficiency function is indicative of an efficiency for collecting the charges by diffusion of the charged particles as a function of particle size,
wherein the pressure reducing unit and the suction unit are arranged to keep an internal pressure of the collecting unit at a selected pressure value such that a negative slope of the collecting efficiency function at least partly compensates a positive slope of the charging efficiency function at least in the particle size range of 40 nm to 200 nm, the selected pressure value being smaller than or equal to 80 kPa,
wherein the suction unit comprises a pump configured to draw a flow from the collecting unit and/or a valve configured to control a flow rate of the suction unit, wherein the suction unit comprises a pressure sensor configured to provide a signal indicative of the internal pressure of the collecting unit, and a control unit configured to adjust the flow rate of the suction unit, so as to keep the internal pressure of the collecting unit substantially equal to the selected pressure value,
wherein the control unit is configured to provide a control signal for controlling operation of the valve and/or for controlling operation of the pump based on the signal of the pressure sensor.

2. The apparatus of claim 1, wherein the negative slope of the collecting efficiency function compensates the positive slope of the charging efficiency function such that a response of the electric current for detecting particles having a mobility size of 200 nm is in the range of 0.9 to 1.1 times a response for detecting particles having a mobility size of 100 nm.

3. The apparatus of claim 1, wherein a response of the electric current for detecting particles having a mobility size of 400 nm is in the range of 0.9 to 1.1 times a response for detecting particles having a mobility size of 100 nm, and wherein a response of the electric current for detecting particles having a mobility size of 40 nm is in the range of 0.9 to 1.1 times a response for detecting particles having a mobility size of 100 nm.

4. The apparatus of claim 1, wherein the charging unit comprises:
a corona electrode to generate ions by forming a corona discharge together with a counter-electrode, a charging space for forming charged particles from the aerosol particles of the aerosol sample flow by diffusion of the generated ions, and one or more flow guides for guiding the received aerosol sample flow via the charging space such that the maximum strength of the electric field across the aerosol sample flow in the charging space is smaller than 100 V/cm.

5. The apparatus of claim 1, wherein the pressure reducing unit comprises one or more critical orifices.

6. The apparatus of claim 1, comprising a diluting unit to form a diluted aerosol sample flow by combining a primary aerosol sample flow with a diluting gas flow.

7. The apparatus of claim 1, comprising an auxiliary detector unit to provide an auxiliary electric current indicative of charge of charged particles which leave the collecting unit.

8. A method for measuring aerosol particles, the method comprising:

using a charging unit to form charged particles from particles of an aerosol sample flow by diffusion charging, using a pressure reducing unit to reduce pressure of the aerosol sample flow, using a suction unit to draw the aerosol sample flow via the charging unit to a collecting unit, using the collecting unit to provide an electric current by collecting charges from the charged particles, wherein the charges are collected from the charged particles by diffusion of the charged particles, the electric current being indicative of a number density of aerosol particles of the aerosol sample flow, and keeping an internal pressure of the collecting unit at a selected pressure value such that a negative slope of a collecting efficiency function at least partly compensates a positive slope of a charging efficiency function at least in the particle size range of 40 nm to 200 nm, wherein the charging efficiency function is indicative of an efficiency of the diffusion charging to charge the particles as a function of particle size, and wherein the collecting efficiency function is indicative of an efficiency for collecting the charges by diffusion of the charged particles as a function of particle, the selected pressure value being smaller than or equal to 80 kPa, wherein the suction unit comprises a pump configured to draw a flow from the collecting unit and/or a valve configured to control a flow rate of the suction unit, wherein the suction unit comprises a pressure sensor configured to provide a signal indicative of the internal pressure of the collecting unit, and a control unit configured to adjust the flow rate of the suction unit, so as to keep the internal pressure of the collecting unit substantially equal to the selected pressure value, wherein the control unit is configured to provide a control signal for controlling operation the valve and/or for controlling operation of the pump based on the signal of the pressure sensor.

9. The method of claim 8, wherein the aerosol sample flow is obtained by sampling exhaust gas of an engine.

10. The method of claim 8, comprising determining a number density value from the electric current, comparing the determined number density value with a limit value, and determining whether the number density value is smaller than the limit value or not.

11. The method of claim 8, comprising guiding the aerosol sample flow through a first critical orifice, guiding a diluting gas flow through a second critical orifice, and forming a diluted aerosol sample flow by combining the aerosol sample flow with the diluting gas flow.

* * * * *